US012693639B2

(12) United States Patent
Kataoka et al.

(10) Patent No.: US 12,693,639 B2
(45) Date of Patent: Jul. 28, 2026

(54) SYSTEM AND METHOD FOR SUBSTRATE PROCESSING USING MODELS AT MULTIPLE LAYERS

(71) Applicant: Tokyo Electron Limited, Tokyo (JP)

(72) Inventors: Yuki Kataoka, Hokkaido (JP); Hironori Moki, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 416 days.

(21) Appl. No.: 18/250,636

(22) PCT Filed: Oct. 29, 2021

(86) PCT No.: PCT/JP2021/040093
§ 371 (c)(1),
(2) Date: Apr. 26, 2023

(87) PCT Pub. No.: WO2022/102439
PCT Pub. Date: May 19, 2022

(65) Prior Publication Data
US 2023/0393540 A1      Dec. 7, 2023

(30) Foreign Application Priority Data

Nov. 10, 2020      (JP) ................................. 2020-187177

(51) Int. Cl.
*G05B 13/04*          (2006.01)
*G05B 23/02*          (2006.01)
(52) U.S. Cl.
CPC ....... *G05B 13/042* (2013.01); *G05B 23/0262* (2013.01); *G05B 23/0283* (2013.01)
(58) Field of Classification Search
USPC ........................................................ 700/29
See application file for complete search history.

(56) References Cited

U.S. PATENT DOCUMENTS

2002/0193902 A1* 12/2002 Shanmugasundram .....................
H01L 21/67276
700/121
2003/0015759 A1* 1/2003 Davis ................... H10D 84/038
257/E21.696

(Continued)

FOREIGN PATENT DOCUMENTS

WO          2018/173121          9/2018
WO          2019/163823          8/2019

*Primary Examiner* — Bernard G Lindsay
(74) *Attorney, Agent, or Firm* — IPUSA, PLLC

(57)          ABSTRACT

A model management system, a model management method, and a model management program that efficiently manage models applied to a substrate manufacturing process is provided. The model management system separately manages the models applied to the substrate manufacturing process in three or more layers, and includes a first management unit configured to manage a model at a predetermined layer, and one or more second management units configured to manage one or more models at a layer one level lower than the predetermined layer. The first management unit includes a calculating unit configured to, when one or more model parameters of the one or more models managed by the one or more second management units are updated, calculate a new model parameter based on each of the updated one or more model parameters, and a control unit configured to perform control so that the new model parameter is set in a plurality of models respectively managed by a plurality of management units at a lowest layer, belonging to the first management unit.

10 Claims, 16 Drawing Sheets

(56) References Cited

U.S. PATENT DOCUMENTS

| | | | |
|---|---|---|---|
| 2010/0041199 A1* | 2/2010 | Anderson | H10D 84/0167 |
| | | | 257/E21.403 |
| 2013/0175656 A1* | 7/2013 | Anderson | H10D 8/022 |
| | | | 257/490 |
| 2013/0211546 A1* | 8/2013 | Lawson | G06F 1/14 |
| | | | 700/9 |
| 2018/0253646 A1 | 9/2018 | Feng et al. | |
| 2020/0226742 A1 | 7/2020 | Sawlani et al. | |

* cited by examiner

Figure 12:
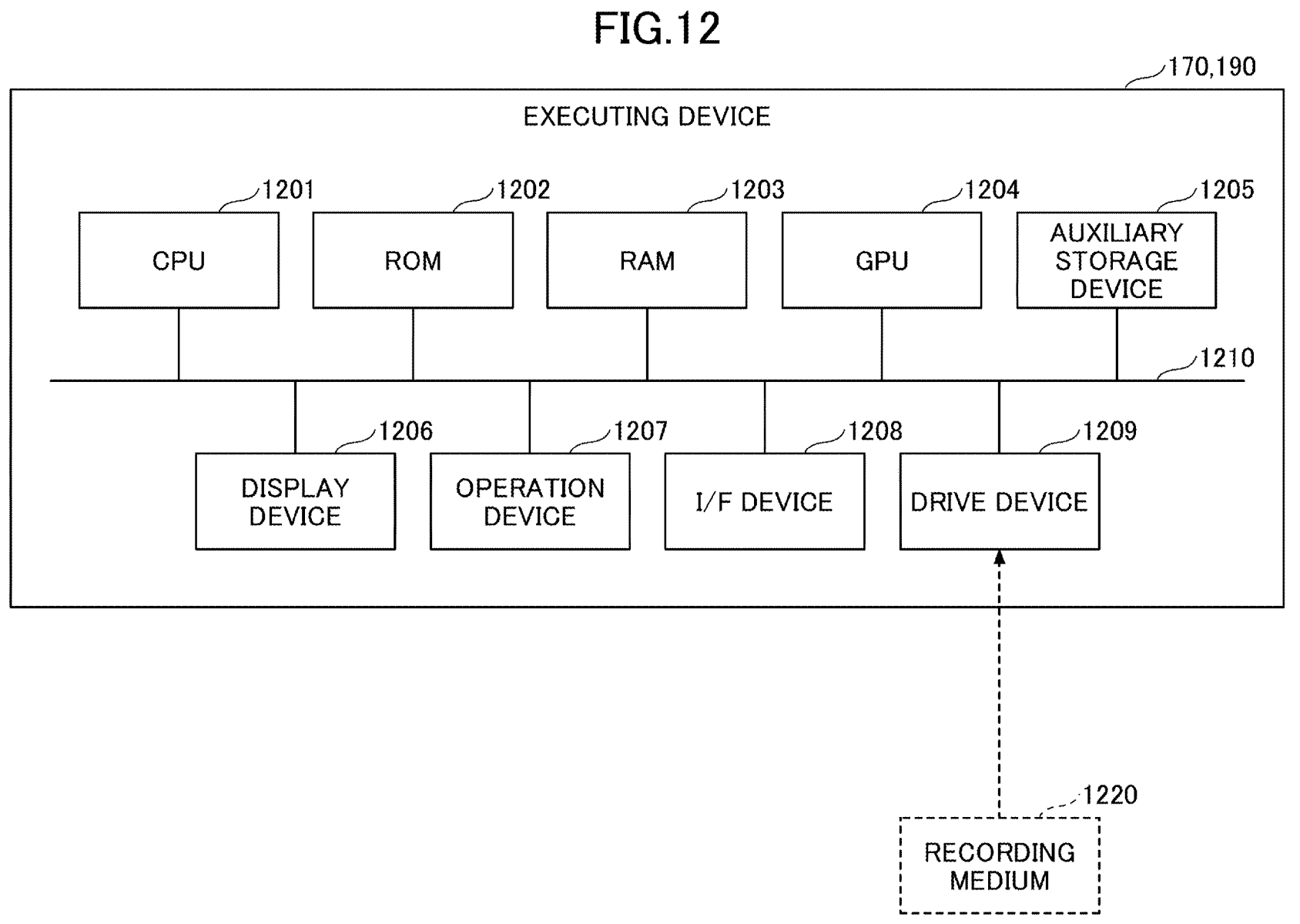

EXECUTING DEVICE

| 1201 | 1202 | 1203 | 1204 | 1205 |
|------|------|------|------|------|
| CPU | ROM | RAM | GPU | AUXILIARY STORAGE DEVICE |

1210

| 1206 | 1207 | 1208 | 1209 |
|------|------|------|------|
| DISPLAY DEVICE | OPERATION DEVICE | I/F DEVICE | DRIVE DEVICE |

1220

RECORDING MEDIUM

SYSTEM AND METHOD FOR SUBSTRATE PROCESSING USING MODELS AT MULTIPLE LAYERS

TECHNICAL FIELD

The present disclosure relates to a model management system, a model management method, and a model management program.

BACKGROUND

In the field of a substrate manufacturing process, various inference models are constructed and used for, for example, device fault detection, an inference of an object obtained as a result of a process treatment, component deterioration diagnosis, an inference of an internal state, control of a process, and the like.

In a substrate manufacturing process, multiple device models are used, and various processes are performed in many types of chambers of the device models. Thus, if each inference model is to be optimized, the number of inference models necessary to be managed becomes enormous, and the management cost increases.

CITATION LIST

Patent Document

[Patent Document 1] International Publication Pamphlet No. WO 2018-173121

[Patent Document 2] International Publication Pamphlet No. WO 2019-163823

SUMMARY

Problem to be Solved by the Invention

The present disclosure provides a model management system, a model management method, and a model management program that efficiently manage models applied to a substrate manufacturing process.

Means for Solving Problem

A model management system according to an aspect of the present disclosure has, for example, the following configuration. That is, a model management system separately manages models applied to a substrate manufacturing process in three or more layers, and the model management system includes a first management unit configured to manage a model in a predetermined layer, and one or more second management units configured to manage one or more models in a layer one level lower than the first management unit. The first management unit includes a calculating unit configured to calculate, when one or more model parameters of the one or more models managed by the one or more second management units are updated, a new model parameter based on each of the updated one or more model parameters, and a control unit configured to perform control so that the new model parameter is set in a plurality of models respectively managed by a plurality of management units at a lowest layer, belonging to the first management unit.

Effect of Invention

According to the present disclosure, a model management system, a model management method, and a model management program that efficiently manage models applied to a substrate manufacturing process can be provided.

BRIEF DESCRIPTION OF THE DRAWINGS

FIG. 12 is a diagram illustrating an example of a hardware configuration of an executing device.

DESCRIPTION OF EMBODIMENTS

Figure 1:
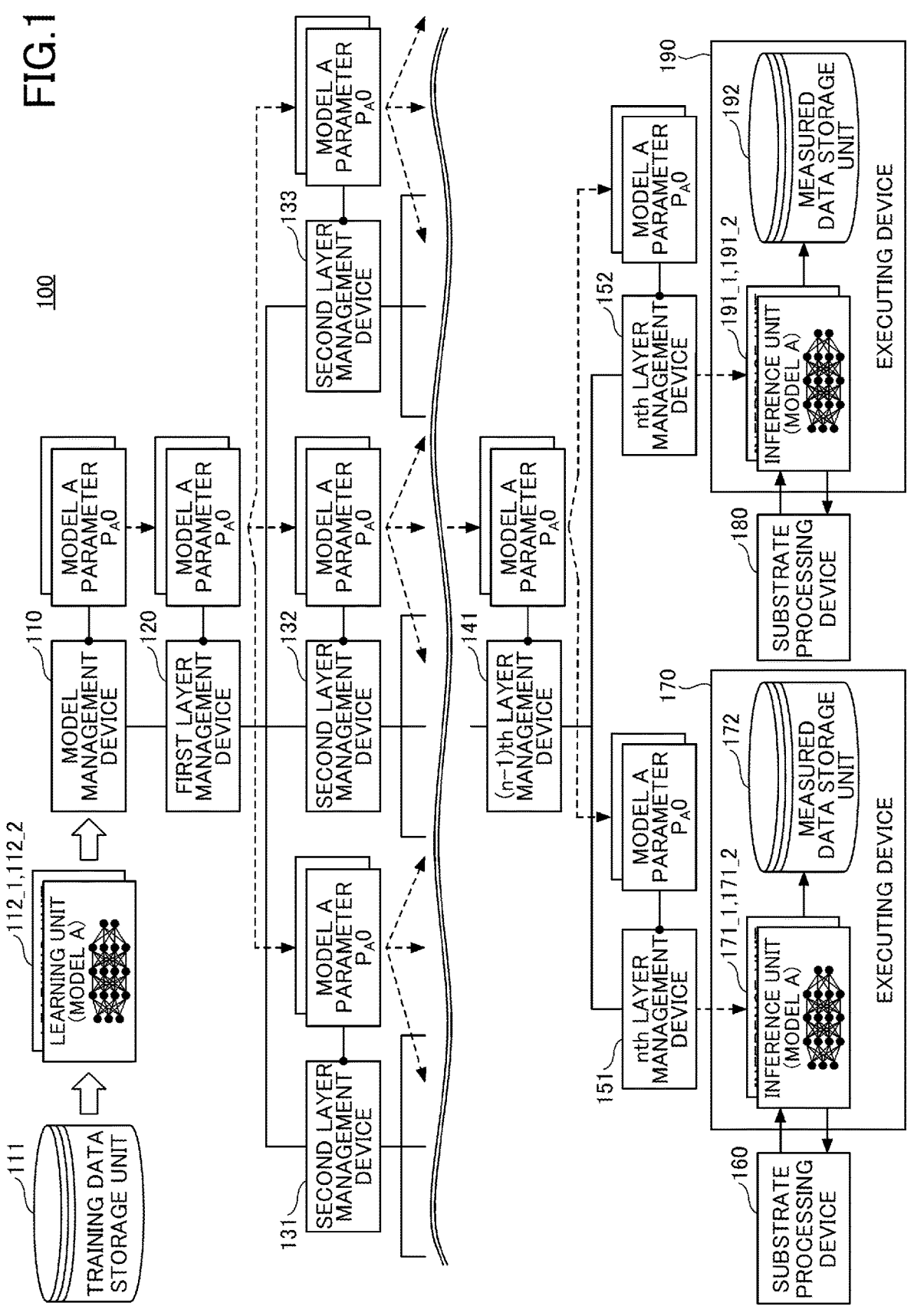
FIG. 1 is a diagram illustrating an example of a system configuration of a model management system in a first phase.

In the following, each embodiment will be described with reference to the accompanying drawings. In the present specification and the drawings, components having substantially the same functional configuration are denoted by the same reference numerals, and overlapped description thereof will be omitted.

First Embodiment

<System Configuration of a Model Management System>

First, a system configuration of a model management system according to a first embodiment will be described. Here, the model management system according to the first embodiment includes multiple management devices, and the management device manages a model (a model structure and a model parameter) in each layer. The model managed by each management device may have one type of model structure or may have multiple types of model structures (in the first embodiment, a case where each management device manages models having two types of model structures will be described). Additionally, in the model management system according to the first embodiment, in a case where the model parameter is optimized by performing a learning process on the model, the model parameter can be shared between the management devices in the same layer by generating a new model parameter.

With this, the types of the model parameters (i.e., the number of the models) to be managed by each management device are aggregated, and the management cost is reduced. Additionally, the management cost (the cost required for learning) is reduced in comparison with a case where a large amount of data is received from a management device at a lower layer to perform relearning.

As a result, according to the model management system of the first embodiment, the model can be efficiently managed.

Thus, in the following description, the process in which the model parameter is shared in the model management system will be described by dividing the process into multiple phases.

(1) System Configuration of the Model Management System in a First Phase

FIG. 1 is a diagram illustrating an example of a system configuration of the model management system in a first phase. As illustrated in FIG. 1, a model management system 100 includes a model management device 110, a training data storage unit 111, and learning units 112_1 and 112_2.

Additionally, the model management system 100 includes a first layer management device 120, second layer management devices 131 to 133, . . . , an (n−1)th layer management device 141, and nth layer management devices 151 and 152, which are examples of a management unit.

Further, the model management system 100 includes a substrate processing device 160, an executing device 170, a substrate processing device 180, and an executing device 190.

The training data storage unit 111 stores training data used when a learning process is performed on a model having a model structure (the model structure="model A") according to a first purpose. The first purpose described herein refers to, for example, a purpose of fault detection of the substrate processing device, an inference of an object obtained as a result of a process treatment, component deterioration diagnosis, an inference of an internal state, and the like. Here, the inference of the processing result includes an inference of a film formation rate, an inference of an etching rate, an inference of a shape of an object obtained as a result of a process treatment, and the like.

Additionally, the training data storage unit 111 stores training data used when a learning process is performed on a model having a model structure (the model structure="model B") according to a second purpose. The second purpose described herein refers to, for example, a purpose of control of a process and the like.

The learning unit 112_1 includes the model having the model structure (the model structure="model A") according to the first purpose, and performs the learning process, using the training data for the model structure="model A" read from the training data storage unit 111. Additionally, the learning unit 112_1 notifies the model management device 110 of a model parameter="parameter $P_A0$" optimized by performing the learning process.

The learning unit 112_2 includes the model having the model structure (the model structure="model B") according to the second purpose, and performs the learning process, using the training data for the model structure="model B"

read from the training data storage unit 111. Additionally, the learning unit 112_2 notifies the model management device 110 of a model parameter="parameter $P_B0$" optimized by performing the learning process.

The model management device 110 manages two types of models (the model structures="model A" and "model B", the model parameters="parameter $P_A0$" and "parameter $P_B0$"). Additionally, in the first phase, the model management device 110 transmits two types of models (the model structures="model A" and "model B", the model parameters="parameter $P_A0$" and "parameter $P_B0$") to the first layer management device 120.

Here, it is assumed that the model management device 110 and the first layer management device 120 are connected to different networks connected via a firewall (not illustrated). Additionally, it is assumed that the first layer management device 120 to the nth layer management devices 151 and 152 are connected to the same local network in the same substrate processing factory.

Here, the second layer management devices 131, 132, and 133 to the nth layer management devices 151 and 152, separately manage models corresponding to respective purposes of each of the substrate processing devices in the same substrate processing factory in multiple layered groups.

For example, the second layer management devices 131, 132, and 133 separately manage models corresponding to respective purposes of each of the substrate processing devices in the same substrate processing factory in groups, each of which includes substrate processing devices having the same "device model". Specifically, when the substrate processing device is a heat treatment device, the models are managed, for example, as follows:

the second layer management device 131 manages a model corresponding to a group of a device model: "a heat treatment device including an oxidation furnace", the second layer management device 132 manages a model corresponding to a group of a device model: "a heat treatment device including a nitriding furnace", and the second layer management device 133 manages a model corresponding to a group of a device model: "a heat treatment device including a metal furnace".

Additionally, when the substrate processing device is an etching device, the models are managed, for example, as follows:

the second layer management device 131 manages a model corresponding to a group of a device model: "an etching device that etches an oxide film", and the second layer management device 132 manages a model corresponding to a group of a device model: "an etching device that etches a poly-Si film".

Additionally, third layer management devices separately manage the models corresponding to the respective groups grouped by the second layer management devices 131 to 133 among the models corresponding to the respective purposes of each of the substrate processing devices in the same substrate processing factory in groups, each of which includes substrate processing devices having the same "chamber type". Specifically, when the substrate processing device is a heat treatment device, the models are managed, for example, as follows:

the third layer management device manages a model corresponding to a group of a heat treatment device whose chamber type is "a chamber for processing an interlayer insulating film" among the models corresponding to the group of the device model: "a heat treatment device having a nitriding furnace", and another third layer management device manages a model corresponding to a group of a heat treatment device whose chamber type is "a chamber for processing a gate insulating film" among the models corresponding to the group of the device mode: "a heat treatment device having a nitriding furnace", and another third layer management device manages a model corresponding to a group of a heat treatment device whose chamber type is "a chamber for processing a gate electrode layer" among the models corresponding to the group of the device model: "a heat treatment device having a metal furnace", and another third layer management device manages a model corresponding to a group of a heat treatment device whose chamber type is "a chamber for processing a metal film" among the models corresponding to the group of the device model: "a heat treatment device having a metal furnace".

Additionally, when the substrate processing device is an etching device, the models are managed, for example, as follows:

the third layer management device manages a model corresponding to a group of an etching device whose chamber type is "a chamber for forming an opening of a contact hole" among the models corresponding to the group of the device model: "an etching device for etching a Poly-Si film", and another third layer management device manages a model corresponding to a group of an etching device whose chamber type is "a chamber for performing wiring trench processing" among the models corresponding to the group of the device model: "an etching device for etching a Poly-Si film".

Additionally, the fourth layer management devices separately manage, among the models corresponding to the respective purposes of each of the substrate processing devices in the same substrate processing factory, models corresponding to respective groups that are grouped by the second layer management devices and that are grouped by the third layer management devices, further in groups of substrate processing devices, each of which has the same "process group". Specifically, when the substrate processing device is a heat treatment device, the models are managed, for example, as follows:

the fourth layer management device manages a model corresponding to a group of a heat treatment device in charge of a process group="first process group" among the models corresponding to the group of the heat treatment device whose chamber type is "a chamber for processing an interlayer insulating film", and another fourth layer management device manages a model corresponding to a group of a heat treatment device in charge of the process group="second process group" among the models corresponding to the group of the heat treatment device whose chamber type is "a chamber for processing an interlayer insulating film".

Additionally, when the substrate processing device is an etching device, the models are, for example, managed as follows:

the fourth layer management device manages a model corresponding to a group of an etching device in charge of a process group="first process group" among models corresponding to the group of the etching device whose chamber type is "a chamber for forming an opening of a contact hole", and another fourth layer management device manages a model corresponding to a group of an etching device in charge of a process group="second process group" among the models corresponding to the group of the etching device whose chamber type is "a chamber for forming an opening of a contact hole".

Returning to the description of the system configuration of FIG. 1. The first layer management device 120 manages the model transmitted from the model management device 110. Additionally, in the first phase, the first layer management device 120 transmits the model transmitted from the model management device 110 to the second layer management devices 131 to 133.

Here, although a case where three second layer management devices are connected to the first layer management device 120 is illustrated in the example of FIG. 1, the number of the second layer management devices connected to the first layer management device 120 is not limited to three.

The second layer management devices 131 to 133 manage the model transmitted from the first layer management device 120, which is a connection destination. Here, in the example of FIG. 1, a case, in which the same model is transmitted from the first layer management device 120, which is a connection destination, to each of the second layer management devices 131 to 133, is illustrated, but the model transmitted to each of the second layer management devices 131 to 133 may be different.

Additionally, in the first phase, each of the second layer management devices 131 to 133 transmits the model transmitted from the first layer management device 120 to the third layer management device (not illustrated).

Additionally, as illustrated in FIG. 1, the (n−1)th layer management device 141 manages the model transmitted from an (n−2)th layer management device, which is a connection destination. Additionally, in the first phase, the (n−1)th layer management device 141 transmits the model transmitted from the (n−2)th layer management device to the nth layer management devices 151 and 152.

Here, although a case where two nth layer management devices are connected to the (n−1)th layer management device 141 is illustrated in the example in FIG. 1, the number of the nth layer management devices connected to the (n−1)th layer management device 141 is not limited to two.

Additionally, as illustrated in FIG. 1, the nth layer management devices 151 and 152 manage the models transmitted from the (n−1)th layer management device, which is connection destination. Additionally, in the first phase, the nth layer management devices 151 and 152 transmit the models transmitted from the (n−1)th layer management device 141 to the executing devices 170 and 190.

The substrate processing device 160 is a processing device that performs a substrate manufacturing process in a physical space, such as a heat treatment device, an etching device, or the like.

The executing device 170 includes:

an inference unit 171_1 in which the model (the model structure="model A" and the model parameter="parameter $P_A0$") transmitted from the nth layer management device 151 is arranged; and an inference unit 171_2 in which the model (the model structure="model B" and the model parameter="parameter $P_B0$") transmitted from the nth layer management device 151 is arranged.

The inference unit 171_1 executes the model (the model structure="model A", the model parameter="parameter $P_A0$") based on data collected from the substrate processing device 160. Additionally, the inference unit 171_1 outputs an inference result (for example, an inference result of fault detection, an inference result of an object obtained as a result of a process treatment, an inference result of component deterioration diagnosis, an inference result of an internal state, or the like). The inference result output from the inference unit 171_1 is stored in a measured data storage unit 172 as measured data in association with correct data, for example.

Additionally, the inference unit 171_2 executes the model (the model structure="model B", the model parameter="parameter $P_B0$") based on data collected from the substrate processing device 160. Additionally, the inference unit 171_2 outputs an inference result (for example, an inference result (a control value) in control of a process). The inference result output from the inference unit 171_2 is stored in the measured data storage unit 172 as measured data in association with, for example, correct data.

Similarly, the substrate processing device 180 is a processing device that performs a substrate manufacturing process in a physical space, such as a heat treatment device, an etching device, or the like.

The executing device 190 includes:

an inference unit 191_1 in which the model (the model structure="model A", model parameter="parameter $P_A0$") transmitted from the nth layer management device 152 is arranged; and an inference unit 191_2 in which the model (the model structure="model B", the model parameter="parameter $P_B0$") transmitted from the nth layer management device 152 is arranged.

The inference unit 191_1 executes the model (the model structure="model A", the model parameter="parameter $P_A0$") based on data collected from the substrate processing device 180. Additionally, the inference unit 191_1 outputs an inference result (for example, an inference result of fault detection, an inference result of an object obtained as a result of a process treatment, an inference result of component deterioration diagnosis, an inference result of an internal state, or the like). The inference result output from the inference unit 191_1 is stored in a measured data storage unit 192 as measured data in association with correct data, for example.

Additionally, the inference unit 191_2 executes the model (the model structure="model B", the model parameter="parameter $P_B0$") based on data collected from the substrate processing device 180. Additionally, the inference unit 191_2 outputs an inference result (for example, an inference result (a control value) in control of a process or the like). The inference result output from the inference unit 191_2 is stored in the measured data storage unit 192 as measured data in association with correct data, for example.

(2) System Configuration of the Model Management System in a Second Phase

Figure 2:
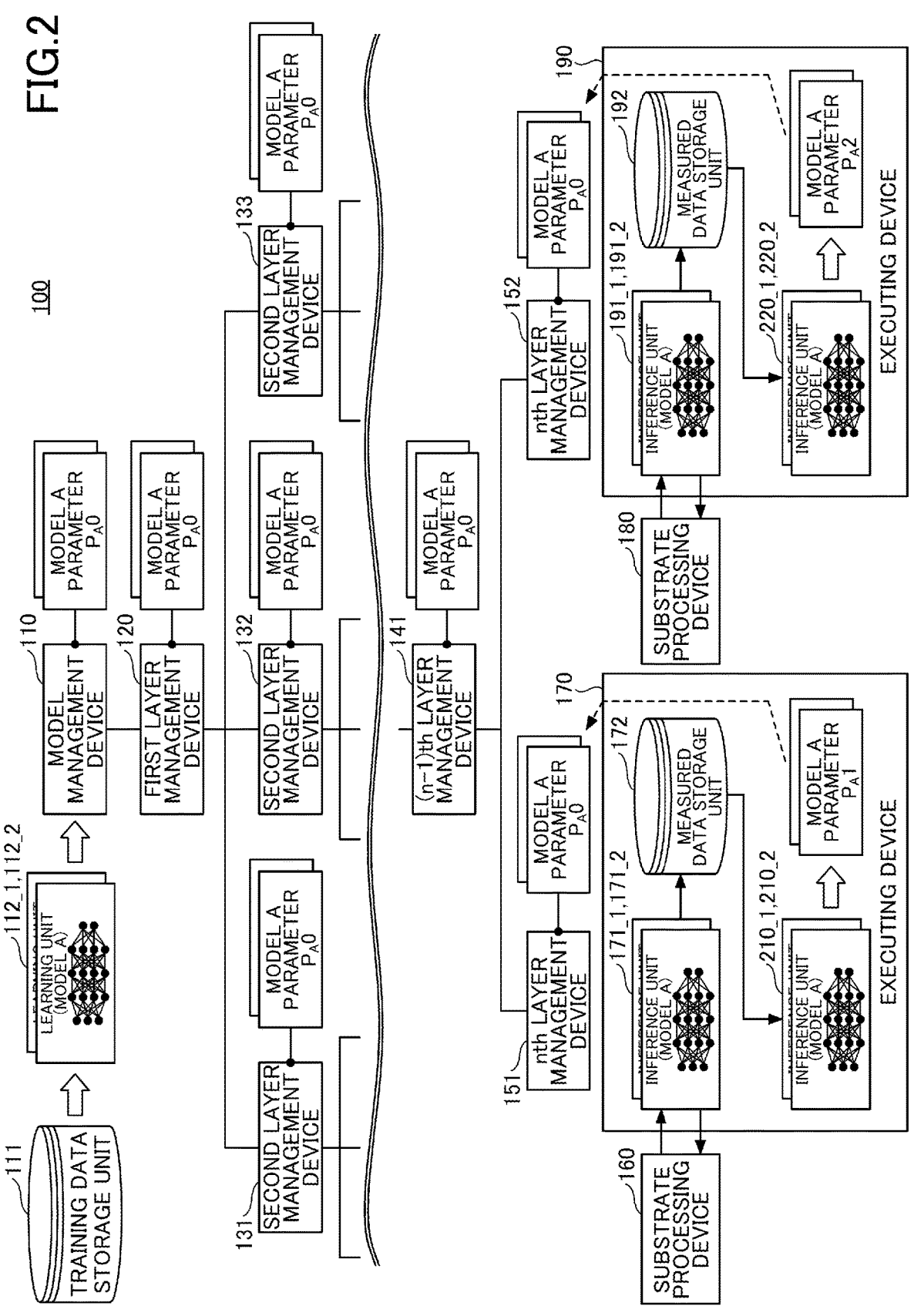
FIG. 2 is a diagram illustrating an example of a system configuration of the model management system in a second phase.

FIG. 2 is a diagram illustrating an example of a system configuration of the model management system in a second phase. As illustrated in FIG. 2, in the second phase, in the model management system 100, the executing device 170 further includes learning units 210_1 and 210_2 in addition to the system configuration in the first phase. Additionally, the executing device 190 includes learning units 220_1 and 220_2.

The model (the model structure="model A", the model parameter="parameter $P_A0$") transmitted from the nth layer management device 151 is arranged in the learning unit 210_1. The learning unit 210_1 performs an additional learning process, using the measured data read from the measured data storage unit 172. This allows the learning unit 210_1 to transmit an optimized model parameter="parameter $P_A1$" to the nth layer management device 151.

Additionally, the model (the model structure="model B", the model parameter="parameter $P_B0$") transmitted from the nth layer management device 151 is arranged in the learning unit 210_2. The learning unit 210_2 performs an additional learning process, using the measured data read from the measured data storage unit 172. This allows the learning unit 210_2 to transmit an optimized model parameter="parameter $P_A1$" to the nth layer management device 151.

Similarly, the model (the model structure="model A", the model parameter="parameter $P_A0$") transmitted from the nth layer management device 152 is arranged in the learning unit 220_1. The learning unit 220_1 performs an additional learning process, using the measured data read from the measured data storage unit 192. This allows the learning unit 220_1 to transmit an optimized model parameter="parameter $P_A2$" to the nth layer management device 152.

Additionally, the model (the model structure="model B", the model parameter="parameter $P_B0$") transmitted from the nth layer management device 152 is arranged in the learning unit 220_2. The learning unit 220_2 performs an additional learning process, using the measured data read from the measured data storage unit 192. This allows the learning unit 220_2 to transmit an optimized model parameter="parameter $P_B2$" to the nth layer management device 152.

(3) System Configuration of the Model Management System in a Third Phase

Figure 3:
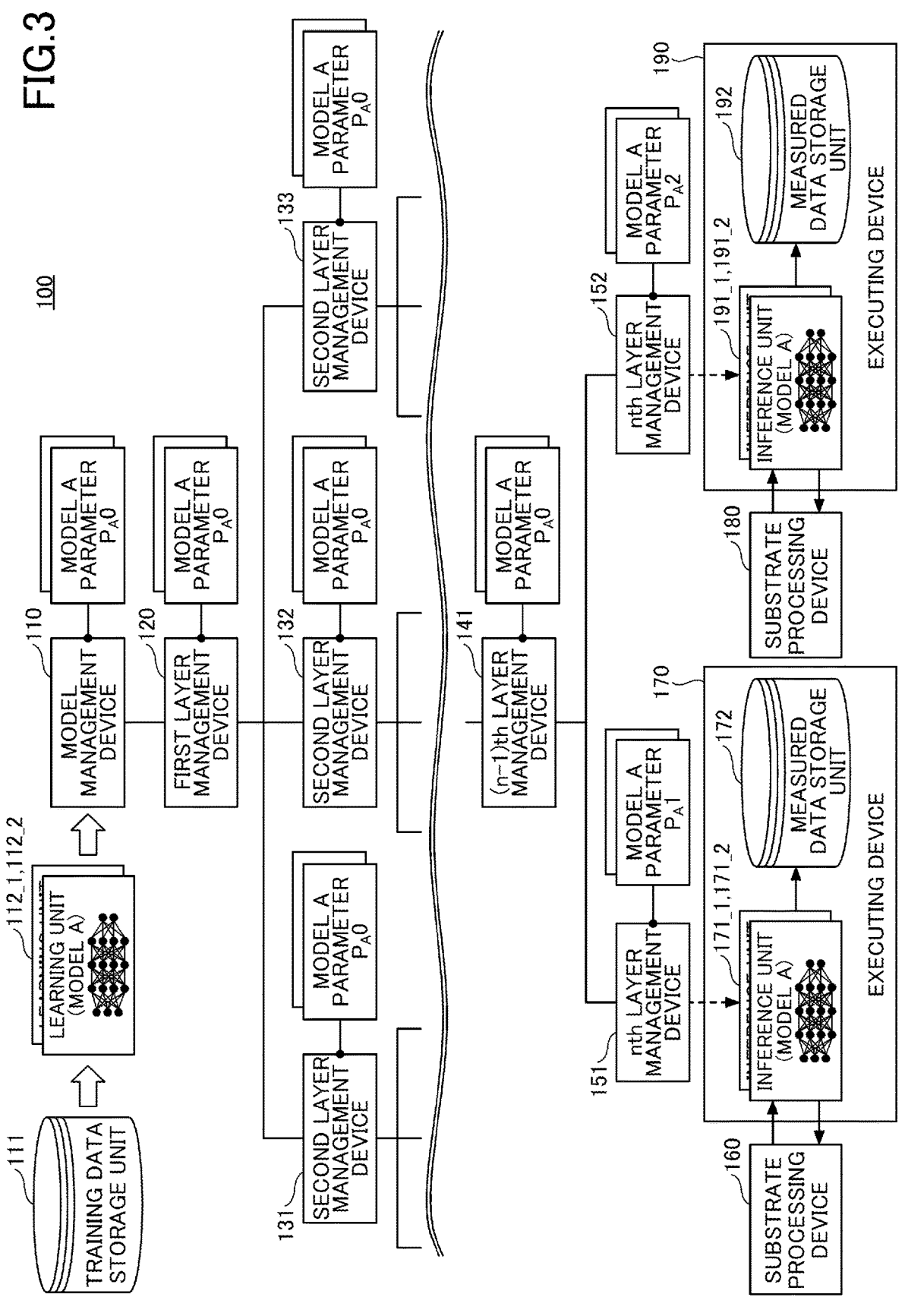
FIG. 3 is a diagram illustrating an example of a system configuration of the model management system in a third phase.

FIG. 3 is a diagram illustrating an example of a system configuration of the model management system in a third phase. As illustrated in FIG. 3, in the third phase, the nth layer management device 151 manages:

the model structures="model A" and "model B"; and the model parameters="parameter $P_A1$" and "parameter $P_B1$" transmitted from the learning units 210_1 and 210_2 in the second phase.

Additionally, in the third phase, the nth layer management device 151 updates the model parameter="parameter $P_A0$" set in the inference unit 171_1, using the model parameter="parameter $P_A1$". Additionally, in the third phase, the nth layer management device 151 updates the model parameter="parameter $P_B0$" set in the inference unit 171_2, using the model parameter="parameter $P_B1$".

Similarly, the nth layer management device 152 manages:

the model structures="model A" and "model B"; and the model parameters="parameter $P_A2$" and "parameter $P_B2$" transmitted from the learning units 220_1 and 220_2 in the second phase.

Additionally, in the third phase, the nth layer management device 152 updates the model parameter="parameter $P_A0$" set in the inference unit 191_1, using the model parameter="parameter $P_A2$". Additionally, in the third phase, the nth layer management device 152 updates the model parameter="parameter $P_B0$" set in the inference unit 191_2, using the model parameter="parameter $P_B2$".

(4) System Configuration of the Model Management System in a Fourth Phase

Figure 4:
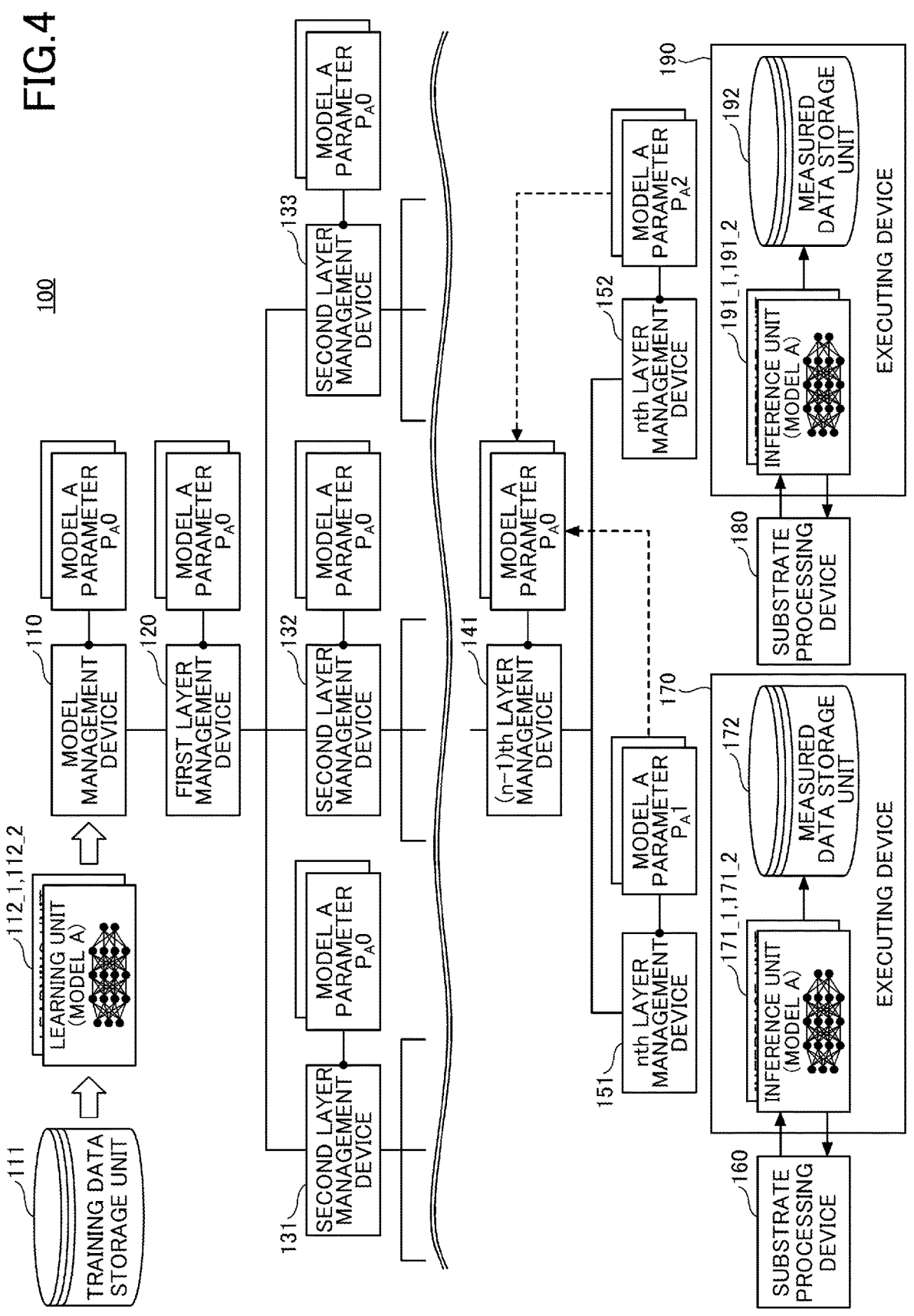
FIG. 4 is a diagram illustrating an example of a system configuration of the model management system in a fourth phase.

FIG. 4 is a diagram illustrating an example of a system configuration of the model management system in a fourth phase. As illustrated in FIG. 4, in the fourth phase, the nth layer management device 151 transmits the model parameters="parameter $P_A1$" and "parameter $P_B1$" to the (n−1)th layer management device 141 at a predetermined timing.

Similarly, in the fourth phase, the nth layer management device 152 transmits the model parameters="parameter $P_A2$" and "parameter $P_B2$" to the (n−1)th layer management device 141 at a predetermined timing.

(5) System Configuration of the Model Management System in a Fifth Phase

Figure 5:
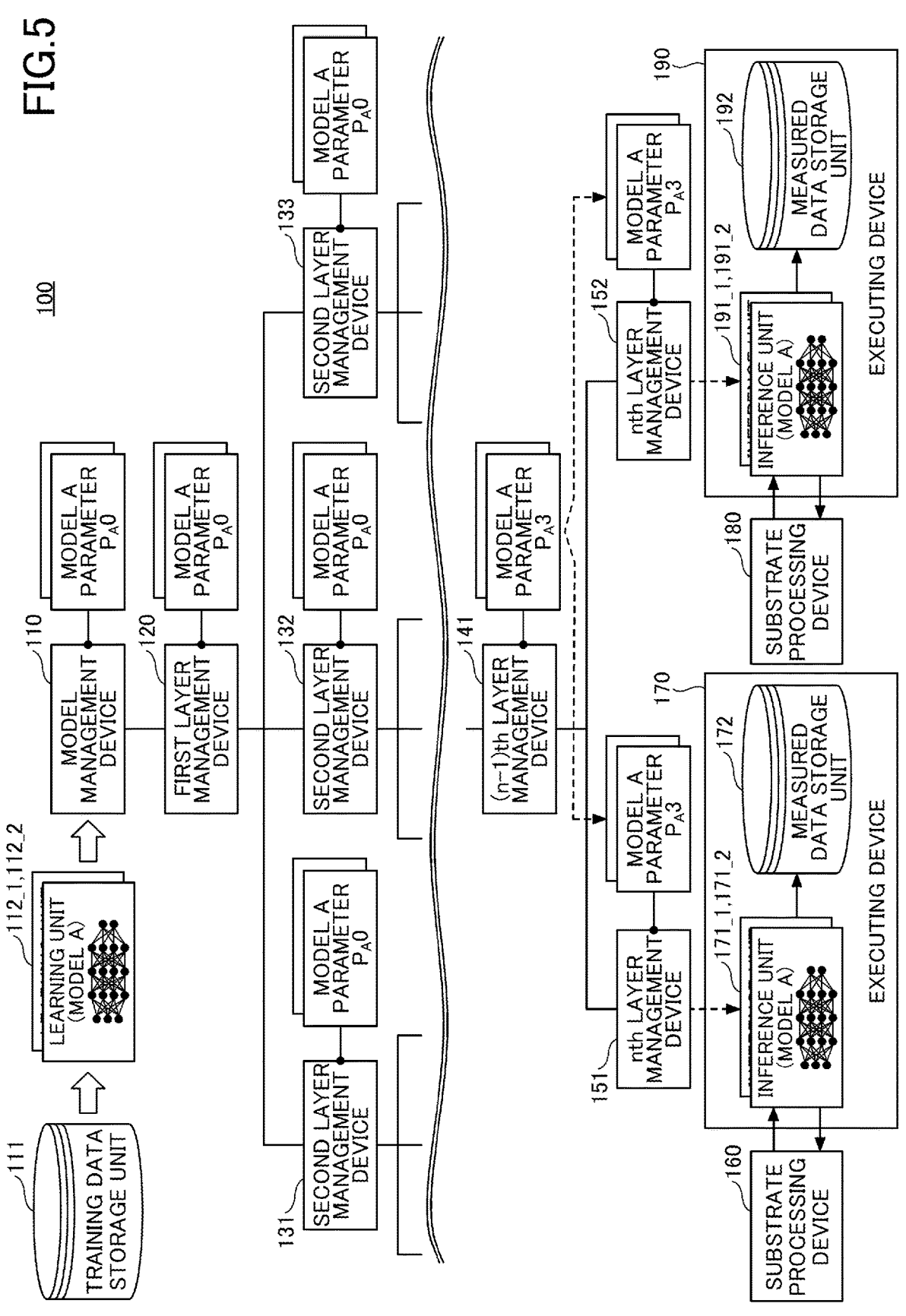
FIG. 5 is a diagram illustrating an example of a system configuration of the model management system in a fifth phase.

FIG. 5 is a diagram illustrating an example of a system configuration of the model management system in a fifth phase. As illustrated in FIG. 5, in the fifth phase, the (n−1)th layer management device 141 calculates new model parameters="parameter $P_A3$" and "parameter $P_B3$" based on the following:

the model parameters="parameter $P_A1$" and "parameter $P_B1$" transmitted from the nth layer management device 151 in the fourth phase; and the model parameters="parameter $P_A2$" and "parameter $P_B2$" transmitted from the nth layer management device 152 in the fourth phase. Here, a method of calculating, by the (n−1)th layer management device 141, the new model parameters is selected as desired, and, for example, the "parameter $P_A3$" may be calculated by adding weighted values of the "parameter $P_A1$" and the "parameter $P_A2$". Similarly, the "parameter $P_B3$" may be calculated by adding weighted values of the "parameter $P_B1$" and the "parameter $P_B2$".

Here, the weights used to add the weighted values are suitably selected. A parameter that does not satisfy a predetermined evaluation criterion among parameters to be added may have a weight of 0 (may be excluded from the parameters to be added), for example.

Additionally, as illustrated in FIG. 5, in the fifth phase, the (n−1)th layer management device 141 manages the model structures="model A" and "model B" and the new model parameters="parameter $P_A3$" and "parameter $P_B3$". Additionally, in the fifth phase, the (n−1)th layer management device 141 transmits the new model parameters="parameter $P_A3$" and "parameter $P_B3$" to the nth layer management devices 151 and 152 connected to the (n−1)th layer management device 141.

Further, as illustrated in FIG. 5, in the fifth phase, the nth layer management devices 151 and 152 manage:

the model structures="model A" and "model B"; and the new model parameters="parameter $P_A3$" and "parameter $P_B3$" transmitted from the (n−1)th layer management device 141, which is a connection destination.

Additionally, in the fifth phase, the nth layer management device 151 updates the model parameter="parameter $P_A1$" set in the model arranged in the inference unit 171_1, using the new model parameter="parameter $P_A3$". Additionally, in the fifth phase, the nth layer management device 151 updates the model parameter="parameter $P_B1$" set in the model arranged in the inference unit 171_2, using the new model parameter="parameter $P_B3$".

Further, in the fifth phase, the nth layer management device 152 updates the model parameter="parameter $P_A2$" set in the model arranged in the inference unit 191_1, using the new model parameter="parameter $P_A3$". Additionally, in the fifth phase, the nth layer management device 152 updates the model parameter="parameter $P_B2$" set in the model arranged in the inference unit 191_2, using the new model parameter="parameter $P_B3$".

With this, the new model parameters ("parameter $P_A3$" and "parameter $P_B3$") are set in the models managed by the respective nth layer management devices 151 and 152 at the lowest layer, belonging to the (n−1)th layer management device 141. That is, the models managed by the respective nth layer management devices 151 and 152 at the lowest layer, belonging to the (n−1)th layer management device 141, are shared (the models are shared between the management devices at the nth layer).

(6) System Configuration of the Model Management System in a Sixth Phase

Figure 6:
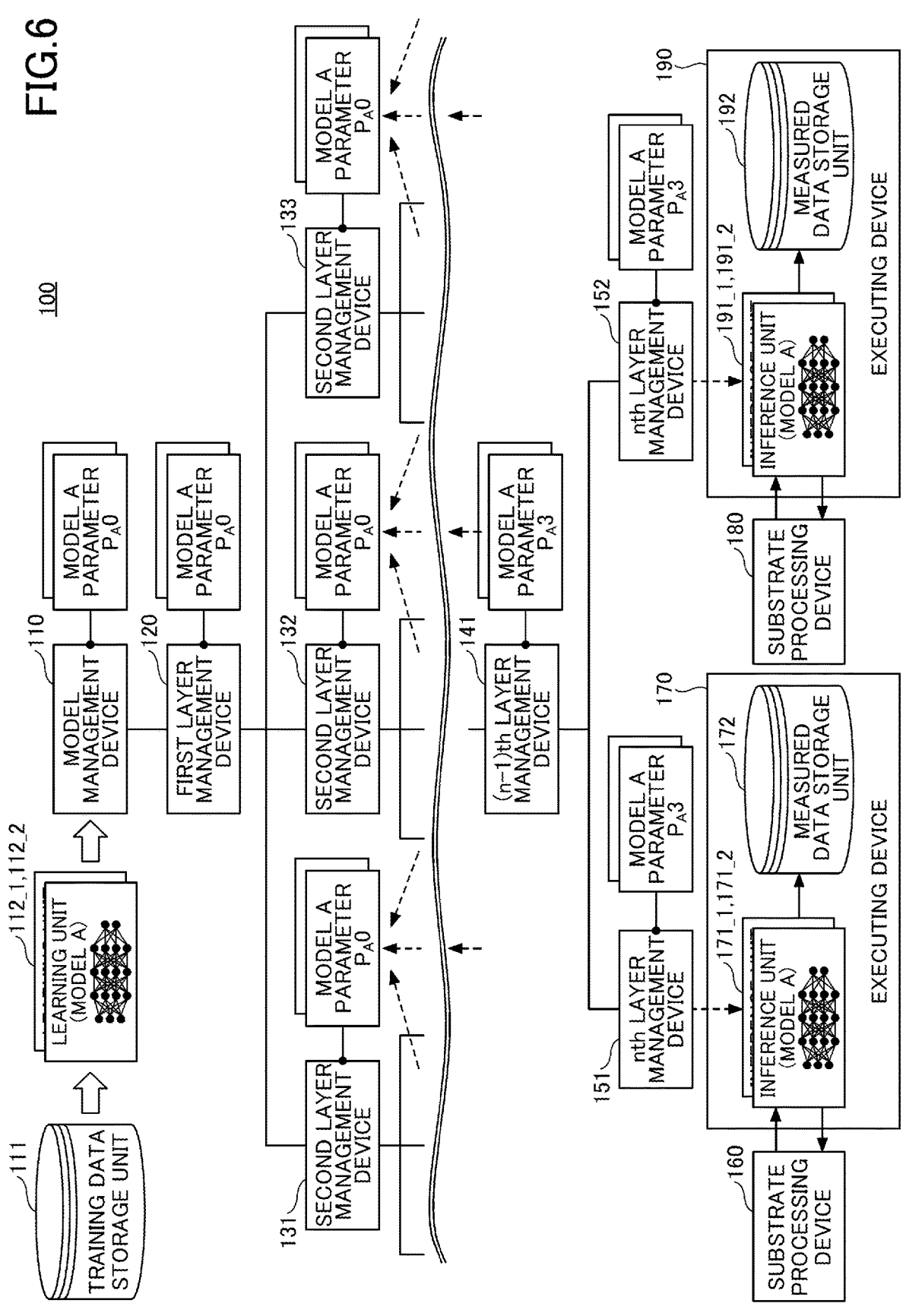
FIG. 6 is a diagram illustrating an example of a system configuration of the model management system in a sixth phase.

FIG. 6 is a diagram illustrating an example of a system configuration of the model management system in a sixth phase. As illustrated in FIG. 6, in the sixth phase, the (n−1)th layer management device 141 transmits the new model parameters="parameter $P_A3$" and "parameter $P_B3$" to the (n−2)th layer management device at a predetermined timing. Here, the following description assumes that the (n−2)th layer management device is the second layer management device 132.

Similarly, in the sixth phase, another (n−1)th layer management device connected to the second layer management device 132 transmits a new model parameter to the second layer management device 132 at a predetermined timing.

Additionally, as illustrated in FIG. 6, in the sixth phase, other (n−1)th layer management devices connected to the second layer management devices 131 and 133 transmit new model parameters to the second layer management devices 131 and 132 at predetermined timings.

(7) System Configuration of the Model Management System in a Seventh Phase

Figure 7:
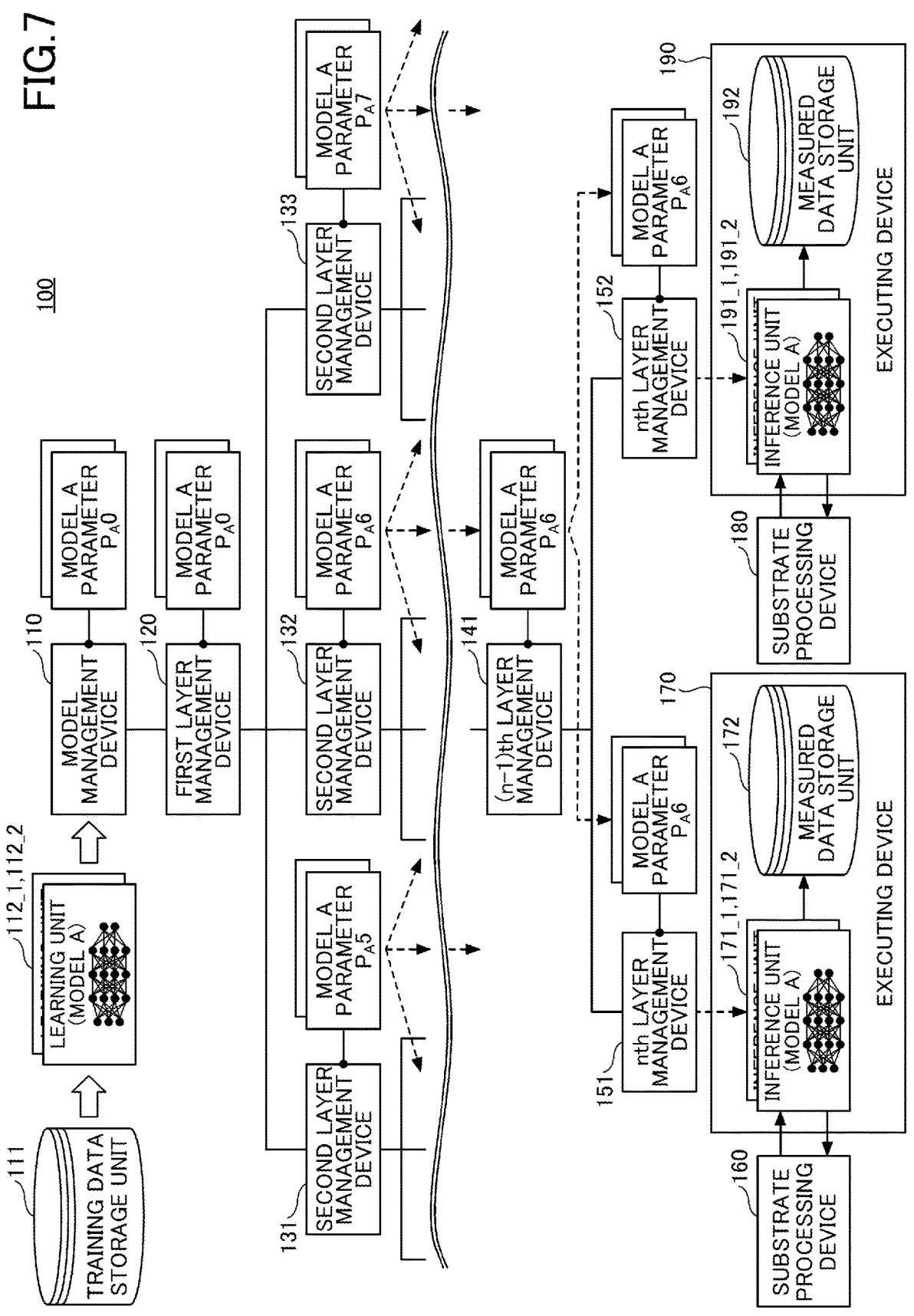
FIG. 7 is a diagram illustrating an example of a system configuration of the model management system in a seventh phase.

FIG. 7 is a diagram illustrating an example of a system configuration of the model management system in a seventh phase. As illustrated in FIG. 7, in the seventh phase, the second layer management device 132 calculates new model parameters="parameter $P_A6$" and "parameter $P_B6$" based on the following:

the model parameters="parameter $P_A3$" and "parameter $P_B3$" transmitted from the (n−1)th layer management device 141 in the sixth phase; and the model parameters transmitted from other (n−1)th layer management devices connected to the second layer management device 132 in the sixth phase.

Additionally, as illustrated in FIG. 7, in the seventh phase, the second layer management device 132 manages the model structures="model A" and "model B" and the new model parameters="parameter $P_A6$" and "parameter $P_B6$". Additionally, in the seventh phase, the second layer management device 132 transmits the new model parameters="parameter $P_A6$" and "parameter $P_B6$" to the (n−1)th layer management device 141 and the like.

Further, as illustrated in FIG. 7, in the seventh phase, the (n−1)th layer management device 141 manages:

the model structures="model A" and "model B"; and the new model parameters="parameter $P_A6$" and "parameter $P_B6$" transmitted from the second layer management device 132, which is a connection destination.

Further, as illustrated in FIG. 7, in the seventh phase, the (n−1)th layer management device 141 transmits the new model parameters="parameter $P_A6$" and "parameter $P_B6$" to the nth layer management devices 151 and 152 connected to the (n−1)th layer management device 141.

Further, as illustrated in FIG. 7, in the seventh phase, the nth layer management devices 151 and 152 manages:

the model structures="model A" and "model B"; and the new model parameters="parameter $P_A6$" and "parameter $P_B6$" transmitted from the (n−1)th layer management device 141, which is a connection destination.

Further, in the seventh phase, the nth layer management device 151 updates the model parameter="parameter $P_A3$"

set in the model arranged in the inference unit 171_1, using the new model parameter="parameter P$_A$6". Additionally, in the seventh phase, the nth layer management device 151 updates the model parameter="parameter P$_B$3" set in the model arranged in the inference unit 171_2, using the new model parameter="parameter P$_B$6".

Additionally, in the seventh phase, the nth layer management device 152 updates the model parameter="parameter P$_A$3" set in the model arranged in the inference unit 191_1, using the new model parameter="parameter P$_A$6". Additionally, in the seventh phase, the nth layer management device 152 updates the model parameter="parameter P$_B$3" set in the model arranged in the inference unit 191_2, using the new model parameter="parameter P$_B$6".

With this, the new model parameters ("parameter P$_A$6" and "parameter P$_B$6") are set in the models managed by the respective nth layer management devices 151 and 152 at the lowest layer, belonging to the second layer management device 132. That is, the models managed by the respective nth layer management devices 151 and 152 at the lowest layer, belonging to the second layer management device 132, are shared (the models are shared between the management devices at the third layer).

Here, although phases have been described up to the seventh phase in the above description, an eighth phase may be further performed. In this case, the models managed by the respective nth layer management devices 151 and 152 at the lowest layer, belonging to the first layer management device 120, are shared. Additionally, in the above description, the case where the first to eighth phases are performed once has been described. However, the first to eighth phases may be repeatedly performed multiple times.

Additionally, the order of performing the phases is not limited to the order described above. For example, after the first to fifth phases are repeatedly performed multiple times, the sixth to seventh phases may be performed. Additionally, after the sixth to seventh phases are repeatedly performed multiple times, the eighth phase may be performed.

Additionally, in the above description, in each phase, the model parameter of the model structure="model A" and the model parameter of the model structure="model B" are updated at the same timing. However, in each phase, the model parameter of the model structure="model A" and the model parameter of the model structure="model B" may be updated at different timings.

<Flow of a Model Management Process>

Figure 8:
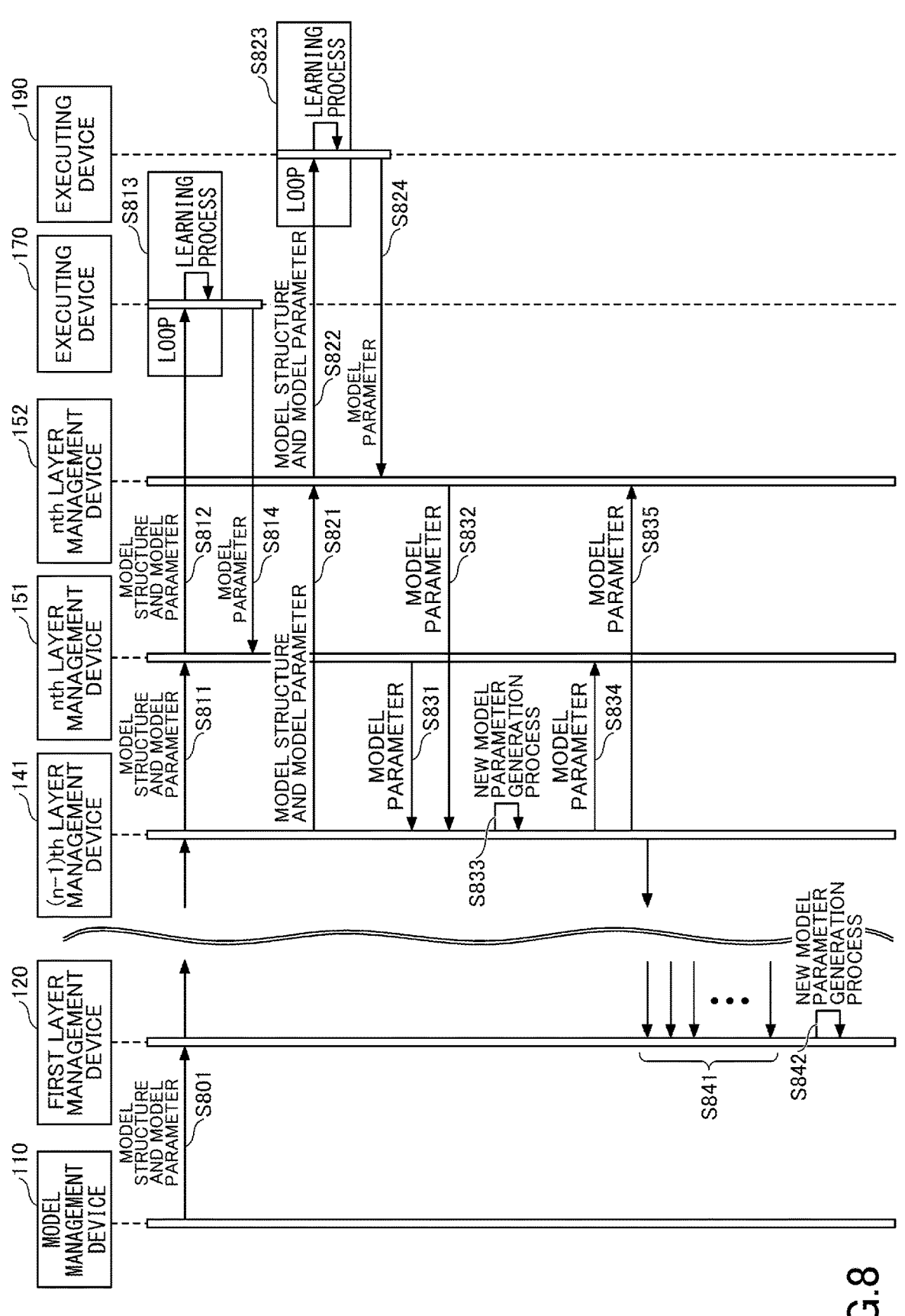
FIG. 8 is a sequence diagram illustrating a flow of a model management process performed by the model management system.

Next, a flow of a model management process performed by the model management system 100 will be described with reference to a sequence diagram. FIG. 8 is the sequence diagram illustrating the flow of the model management process performed by the model management system. Here, when the model management process illustrated in FIG. 8 is performed, it is assumed that the learning processes of the learning units 112_1 and 112_2 are completed and the model structures and the model parameters are managed by the model management device 110.

As illustrated in FIG. 8, in step S801, the model management device 110 transmits the managed model structure and model parameter to the first layer management device 120. Here, it is assumed that the model structures and the model parameters transmitted to the first layer management device 120 are sequentially transmitted to the management devices at the lower layers, belonging to the first layer management device 120, for example, up to the (n−1)th layer management device 141.

In step S811, the (n−1)th layer management device 141 transmits the transmitted model structure and model parameter to the nth layer management device 151.

In step S812, the nth layer management device 151 transmits the transmitted model structure and model parameter to the executing device 170.

In step S813, the executing device 170 sets the transmitted model parameter in the transmitted model structure and executes the model. Additionally, the executing device 170 stores the inference result output from the model in association with the correct data as the measured data, and performs the learning process using the stored measured data.

In step S814, the executing device 170 transmits, to the nth layer management device 151, the model parameter optimized by performing the learning process using the measured data.

Additionally, in step S821, the (n−1)th layer management device 141 transmits the transmitted model structure and model parameter to the nth layer management device 152.

In step S822, the nth layer management device 152 transmits the transmitted model structure and model parameter to the executing device 190.

In step S823, the executing device 190 sets the transmitted model parameter in the transmitted model structure and executes the model. Additionally, the executing device 190 stores the inference result output from the model in association with the correct data as the measured data, and performs the learning process using the stored measured data.

In step S824, the executing device 190 transmits, to the nth layer management device 152, the model parameter optimized by performing the learning process using the measured data.

In step S831, the nth layer management device 151 transmits the optimized model parameter to the (n−1)th layer management device 141.

In step S832, the nth layer management device 152 transmits the optimized model parameter to the (n−1)th layer management device 141.

In step S833, the (n−1)th layer management device 141 generates the new model parameter based on the model parameter transmitted from the nth layer management device 151 and the model parameter transmitted from the nth layer management device 152.

In step S834, the (n−1)th layer management device 141 transmits the new model parameter to the nth layer management device 151. Here, thereafter, the processing the same as steps S812 to S814 and S831 described above is performed.

In step S835, the (n−1)th layer management device 141 transmits the new model parameter to the nth layer management device 152. Here, thereafter, the same processing as steps S822 to S824 and S832 described above is performed.

Additionally, also in a layer higher than the (n−1)th layer management device 141, the processing substantially the same as steps S831 to S835 described above is repeated.

As a result, in step S841, each of the multiple second layer management devices transmits the optimized model parameter to the first layer management device 120, which is a connection destination.

In step S842, the first layer management device 120 generates the new model parameter, using the model parameters transmitted from the multiple second layer management devices that are one layer lower and that are connected to the first layer management device 120. The new model parameter generated by the first layer management device 120 is transmitted to the multiple second layer management devices that are one layer lower and that are connected to the first layer management device 120. Thereafter, the processing the same as steps S811 to S814, S831, steps S821 to S824, and S832 is performed.

<Hardware Configuration of an xth Layer Management Device>

Figure 9:
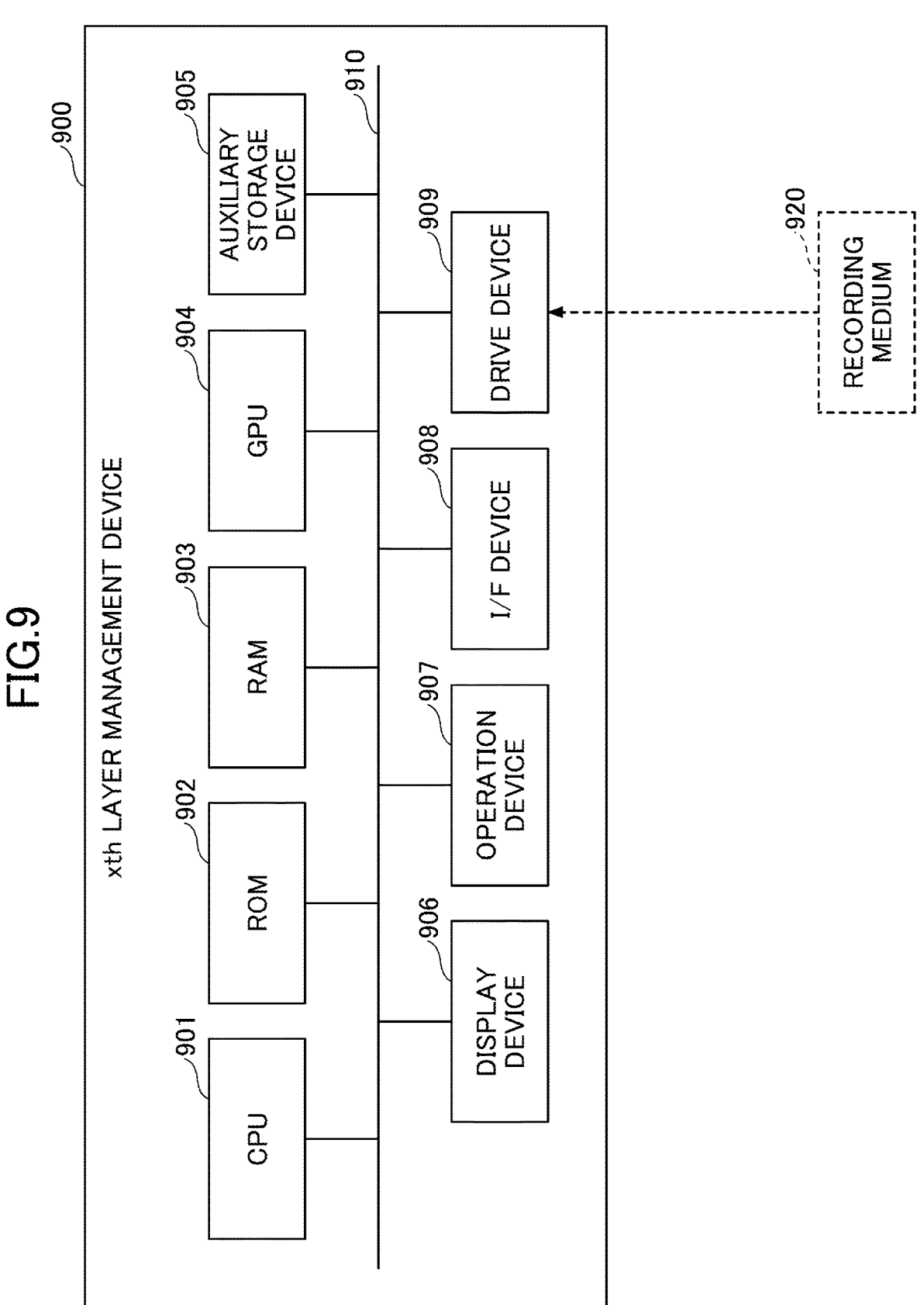
FIG. 9 is a diagram illustrating an example of a hardware configuration of an xth layer management device.

Next, a hardware configuration of each of the management devices from the first layer management device 120 to the nth layer management devices 151 and 152 will be described. Here, because each of the management devices from the first layer management device 120 to the nth layer management devices 151 and 152 has substantially the same hardware configuration, the hardware configuration of an xth layer management device, which is a management device at an xth layer (x is any integer from 1 to n), will be described here. FIG. 9 is a diagram illustrating an example of the hardware configuration of the xth layer management device.

As illustrated in FIG. 9, an xth layer management device 900 includes a central processing unit (CPU) 901, a read only memory (ROM) 902, and a random access memory (RAM) 903. Additionally, the xth layer management device 900 includes a graphics processing unit (GPU) 904. Here, the processors (processing circuits, processing circuitry) such as the CPU 901, the GPU 904 and the like and the memories such as the ROM 902, the RAM 903 and the like form what is called a computer.

The xth layer management device 900 further includes an auxiliary storage device 905, a display device 906, an operation device 907, an interface (I/F) device 908, and a drive device 909. Here, the hardware components of the xth layer management device 900 are connected to each other via a bus 910.

The CPU 901 is a computing device that executes various programs (for example, a model management program, which will be described later) installed in the auxiliary storage device 905.

The ROM 902 is a nonvolatile memory and functions as a main storage device. The ROM 902 stores various programs, data, and the like necessary for the CPU 901 to execute the various programs installed in the auxiliary storage device 905. Specifically, the ROM 902 stores a boot program and the like, such as a basic input/output system (BIOS), an extensible firmware interface (EFI), or the like.

The RAM 903 is a volatile memory such as a dynamic random access memory (DRAM), a static random access memory (SRAM), or the like, and functions as a main storage device. The RAM 903 provides a work area in which various programs installed in the auxiliary storage device 905 are deployed when the programs are executed by the CPU 901.

The GPU 904 is a computing device for image processing, and in the present embodiment, when the model management program is executed by the CPU 901, high-speed computation is performed on two-dimensional data by parallel processing. Here, the GPU 904 is equipped with an internal memory (a GPU memory), and temporarily retains information necessary for parallel processing for the two-dimensional data.

The auxiliary storage device 905 stores various programs, various types of data used when the various programs are executed by the CPU 901, and the like. For example, a distribution information storage unit 1011, an update information storage unit 1012, and a lower layer information storage unit 1013, which will be described later, are implemented in the auxiliary storage device 905.

The display device 906 is, for example, a display device that displays an internal state of the xth layer management device 900. The operation device 907 is an input device used when a user of the xth layer management device 900 inputs various instructions to the xth layer management device 900. The I/F device 908 is a connection device for transmitting and receiving data to and from another management device.

The drive device 909 is a device for setting a recording medium 920. The recording medium 920 herein includes a medium for optically, electrically, or magnetically recording information, such as a CD-ROM, a flexible disk, and a magneto-optical disk. Additionally, the recording medium 920 may include a semiconductor memory or the like that electrically records information, such as a ROM, a flash memory, and the like.

Here, the various programs to be installed in the auxiliary storage device 905 are installed by, for example, the distributed recording medium 920 being set in the drive device 909 and by the various programs recorded in the recording medium 920 being read by the drive device 909. Alternatively, the various programs to be installed in the auxiliary storage device 905 may be installed by being downloaded via a network, which is not illustrated.

<Functional Configuration of the xth Layer Management Device>

Next, a functional configuration of each of the management devices from the first layer management device 120 to the nth layer management devices 151 and 152 will be described. Here, because each of the management devices from the first layer management device 120 to the nth layer management devices 151 and 152 has substantially the same functional configuration, a functional configuration of the xth layer management device, which is a management device at the xth layer (x is any integer from 1 to n), will be described here.

However, in the following description, when x=1, a management device at a layer one level higher than the xth layer management device refers to the model management device 110. Additionally, when x=n, a management device one level lower than the xth layer management device refers to the executing devices 170 and 190.

Figure 10:
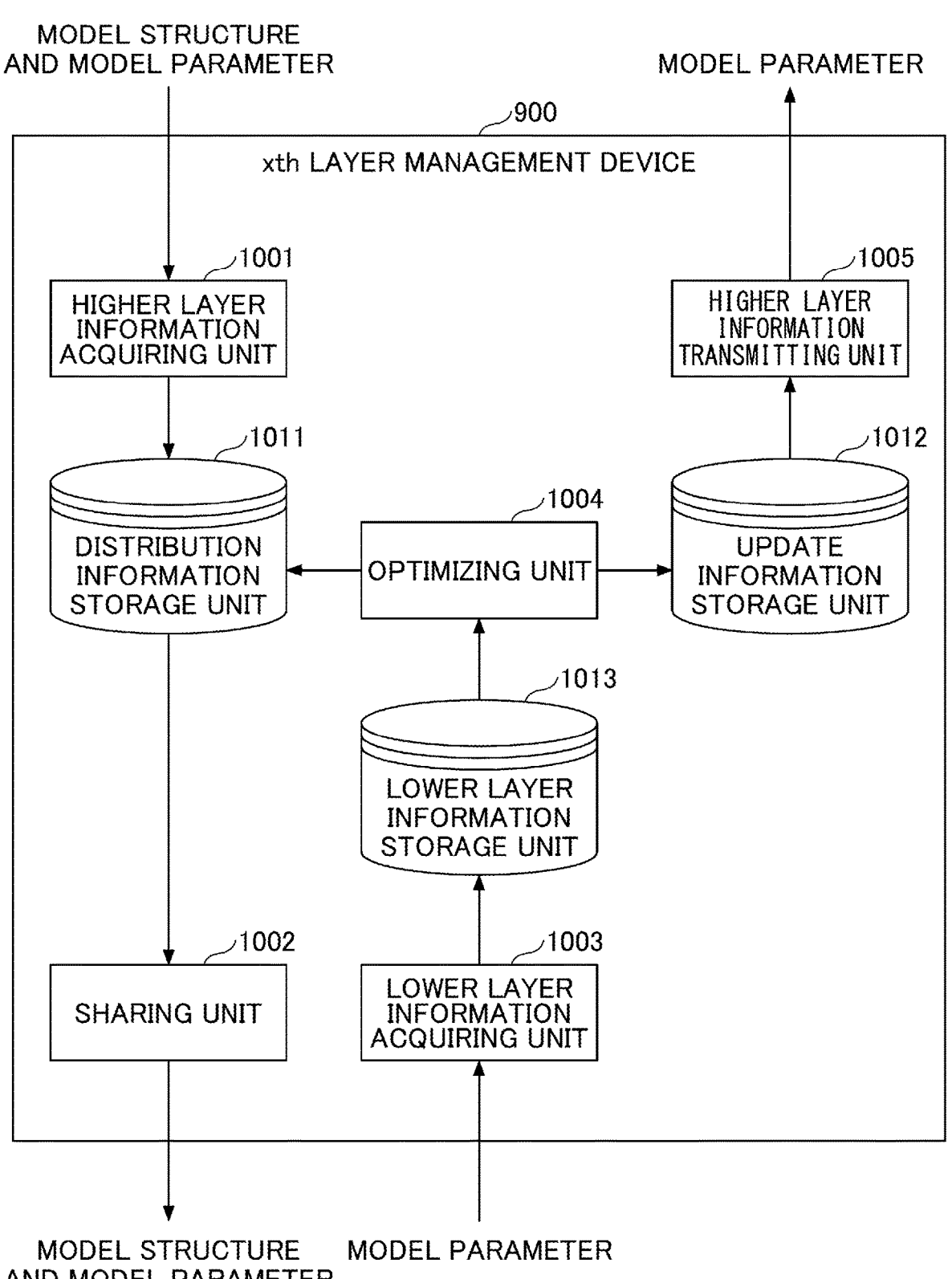
FIG. 10 is a diagram illustrating an example of a functional configuration of the xth layer management device.

FIG. 10 is a diagram illustrating an example of the functional configuration of the xth layer management device. As described above, the model management program is installed in the xth layer management device 900, and when the program is executed, the xth layer management device 900 functions as a higher layer information acquiring unit 1001 and a sharing unit 1002. Additionally, the xth layer management device 900 functions as a lower layer information acquiring unit 1003, an optimizing unit 1004, and a higher layer information transmitting unit 1005.

When both the model structure and the model parameter, or the model parameter are transmitted from a management device that is at a layer one level higher and to which the xth layer management device 900 is connected, the higher layer information acquiring unit 1001 acquires both the model structure and the model parameter, or the model parameter. Additionally, the higher layer information acquiring unit 1001 stores the acquired model structure and model parameter in the distribution information storage unit 1011. Alternatively, the higher layer information acquiring unit 1001 uses the acquired model parameter to update the model parameter already stored in the distribution information storage unit 1011.

The sharing unit 1002 is an example of a control unit. When the model and the model parameter are newly stored in the distribution information storage unit 1011, the sharing unit 1002 reads the model and the model parameter and transmits the model and the model parameter to a management device that is one level lower and that is connected to the xth layer management device 900. Additionally, when the model parameter stored in the distribution information storage unit 1011 is updated, the sharing unit 1002 reads the model parameter and transmits the model parameter to a management device that is one level lower and that is connected to the xth layer management device 900.

When the model parameter is transmitted from a management device that is one level lower and that is connected to the xth layer management device 900, the lower layer information acquiring unit 1003 acquires the model parameter. Additionally, the lower layer information acquiring unit 1003 stores the acquired model parameter in the lower layer information storage unit 1013.

The optimizing unit 1004 is an example of a calculating unit. The optimizing unit 1004 reads the model parameter that is notified by the lower layer information acquiring unit 1003 and that is stored in the lower layer information storage unit 1013, and generates the new model parameter. As described above, the method of calculating the new model parameter is suitably selected, and for example, the new model parameter may be generated by adding weighted values of the multiple model parameters read from the lower layer information storage unit 1013. Additionally, a condition under which the optimizing unit 1004 generates the new model parameter is suitably selected, and the new model parameter may be generated when the suitably selected condition is satisfied. For example, the new model parameter may be generated under the condition that a predetermined time period has elapsed or under the condition that a predetermined number or more of the multiple model parameters have been stored. Here, the multiple model parameters refer to model parameters transmitted from the respective multiple management devices that are the management devices at a layer one level lower and that are connected to the xth layer management device 900.

Additionally, the optimizing unit 1004 updates the model parameter already stored in the distribution information storage unit 1011, using the generated new model parameter. Furthermore, the optimizing unit 1004 stores the generated new model parameter in the update information storage unit 1012.

The higher layer information transmitting unit 1005 is an example of a transmitting unit. when the new model parameter is stored in the update information storage unit 1012, the higher layer information transmitting unit 1005 reads the new model parameter and transmits the new model parameter at a predetermined timing to the management device that is at a layer one level higher and to which the xth layer management device 900 is connected.

<Flow of a Management Process Performed by the xth Layer Management Device>

Figure 11:
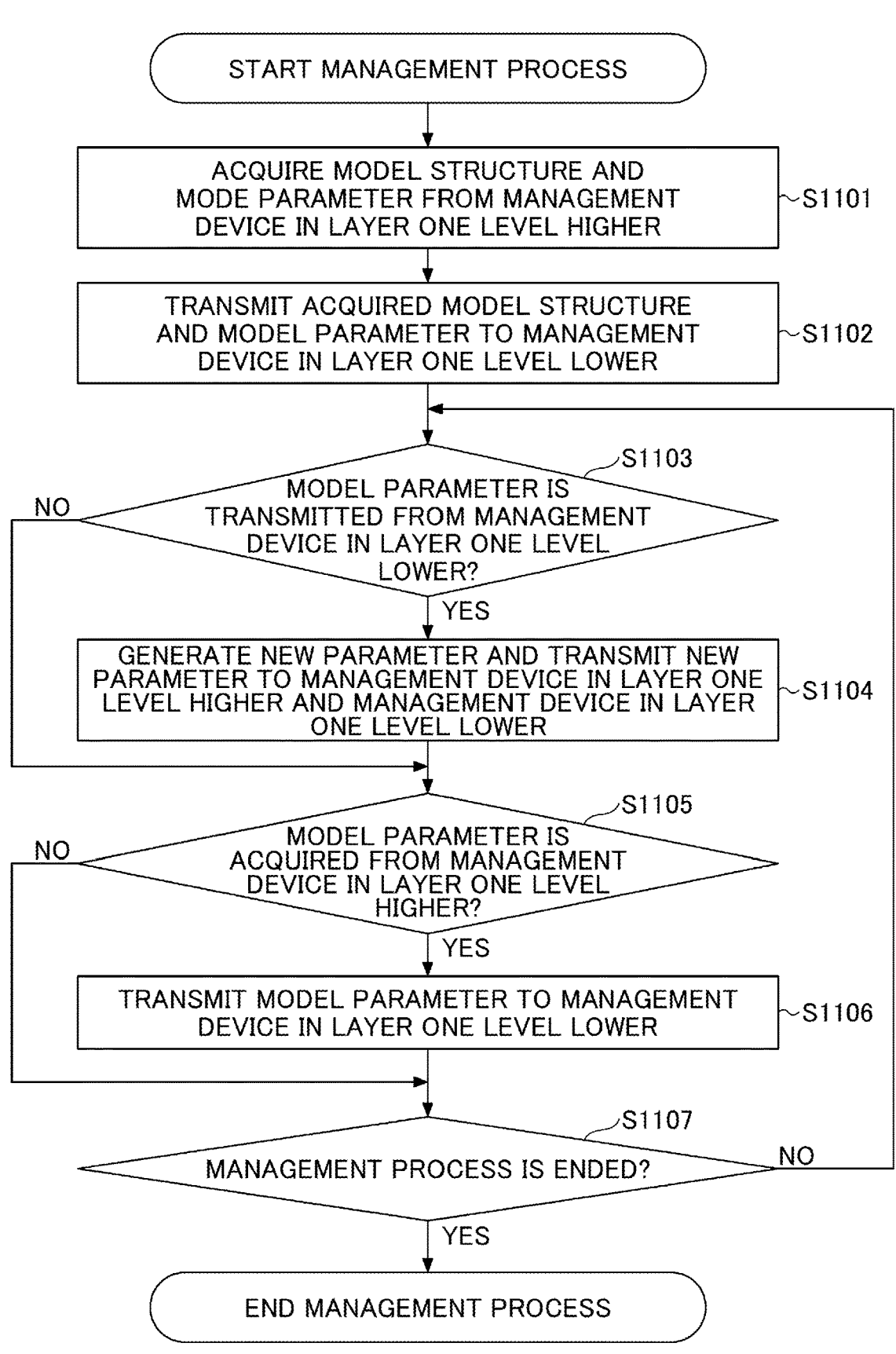
FIG. 11 is a flowchart illustrating a flow of a management process performed by the xth layer management device.

Next, a flow of a management process performed by the xth layer management device 900 will be described. FIG. 11 is a flowchart illustrating the flow of the management process performed by the xth layer management device.

In step S1101, the higher layer information acquiring unit 1001 of the xth layer management device 900 acquires the model structure and the model parameter from the management device at a layer one level higher to which the xth layer management device 900 connected, and stores the model structure and the model parameter in the distribution information storage unit 1011.

In step S1102, the sharing unit 1002 of the xth layer management device 900 reads the model structure and the model parameter from the distribution information storage unit 1011, and transmits the model structure and the model parameter to the management device that is one level lower and that is connected to the xth layer management device.

In step S1103, the lower layer information acquiring unit 1003 of the xth layer management device 900 determines whether the model parameter has been transmitted from any management device that is one level lower and that is connected to the xth layer management device 900.

In step S1103, if it is determined that the model parameter is transmitted (YES in step S1103), the process proceeds to step S1104.

In step S1104, the lower layer information acquiring unit 1003 of the xth layer management device 900 stores the transmitted model parameter in the lower layer information storage unit 1013. Additionally, the optimizing unit 1004 reads the model parameters from the lower layer information storage unit 1013, generates the new model parameter, and updates the model parameters already stored in the distribution information storage unit 1011 and the update information storage unit 1012. Additionally, the sharing unit 1002 transmits the updated new model parameter to the management devices that are at a layer one level lower and that are connected to the xth layer management device 900. Additionally, the higher layer information transmitting unit 1005 transmits the updated new model parameter to the management device that is at a layer one level higher and to which the xth layer management device 900 is connected. Subsequently, the process proceeds to step S1105.

Conversely, in step S1103, if it is determined that the model parameter is not transmitted (NO in step S1103), the process directly proceeds to step S1105.

In step S1105, the higher layer information acquiring unit 1001 of the xth layer management device 900 determines whether the model parameter has been transmitted from the management device that is at a layer one level higher and to which the xth layer management device 900 is connected.

In step S1105, if it is determined that the model parameter is transmitted (YES in step S1105), the process proceeds to step S1106.

In step S1106, the higher layer information acquiring unit 1001 of the xth layer management device 900 acquires the model parameter transmitted from the management device at the layer one level higher to which the xth layer management device 900 is connected. Additionally, the higher layer information acquiring unit 1001 of the xth layer management device 900 uses the acquired model parameter to update the model parameter already stored in the distribution information storage unit 1011. Furthermore, the sharing unit 1002 transmits the updated new model parameter to the management devices that are at a layer one level lower and that are connected to the xth layer management device 900, and the process proceeds to step S1107.

Conversely, in step S1105, if it is determined that the model parameter is not transmitted (NO in step S1105), the process directly proceeds to step S1107.

In step S1107, the xth layer management device 900 determines whether to end the management process. If it is determined in step S1107 that the management process is not to be ended (NO in step S1107), the process returns to step S1103.

Conversely, in step S1107, if it is determined that the management process is to be ended (YES in step S1107), the management process is ended.

<Hardware Configuration of the Executing Device>

Next, a hardware configuration of the executing devices 170 and 190 will be described. FIG. 12 is a diagram illustrating an example of the hardware configuration of the executing device. Here, because the hardware configuration of the executing devices 170 and 190 is substantially the same as the hardware configuration of the xth layer management device 900, only the differences will be described here.

A CPU 1201 is a computing device that executes various programs (for example, an execution program, which will be described later) installed in the auxiliary storage device 1205.

An auxiliary storage device 1205 stores various programs, various types of data used when the various programs are executed by the CPU 1201, and the like. For example, model information storage units 1321 and 1323 and measured data storage units 172-1 and 172-2, which will be described later, are implemented in the auxiliary storage device 1205.

Here, the hardware configuration illustrated in FIG. 12 is an example, and the executing devices 170 and 190 may be configured by, for example, a field-programmable gate array (FPGA). Alternatively, the executing devices 170 and 190 may be configured by, for example, an AI chip (a semiconductor specialized in artificial intelligence (AI) processing).

<Functional Configuration of the Executing Device>

Figure 13:
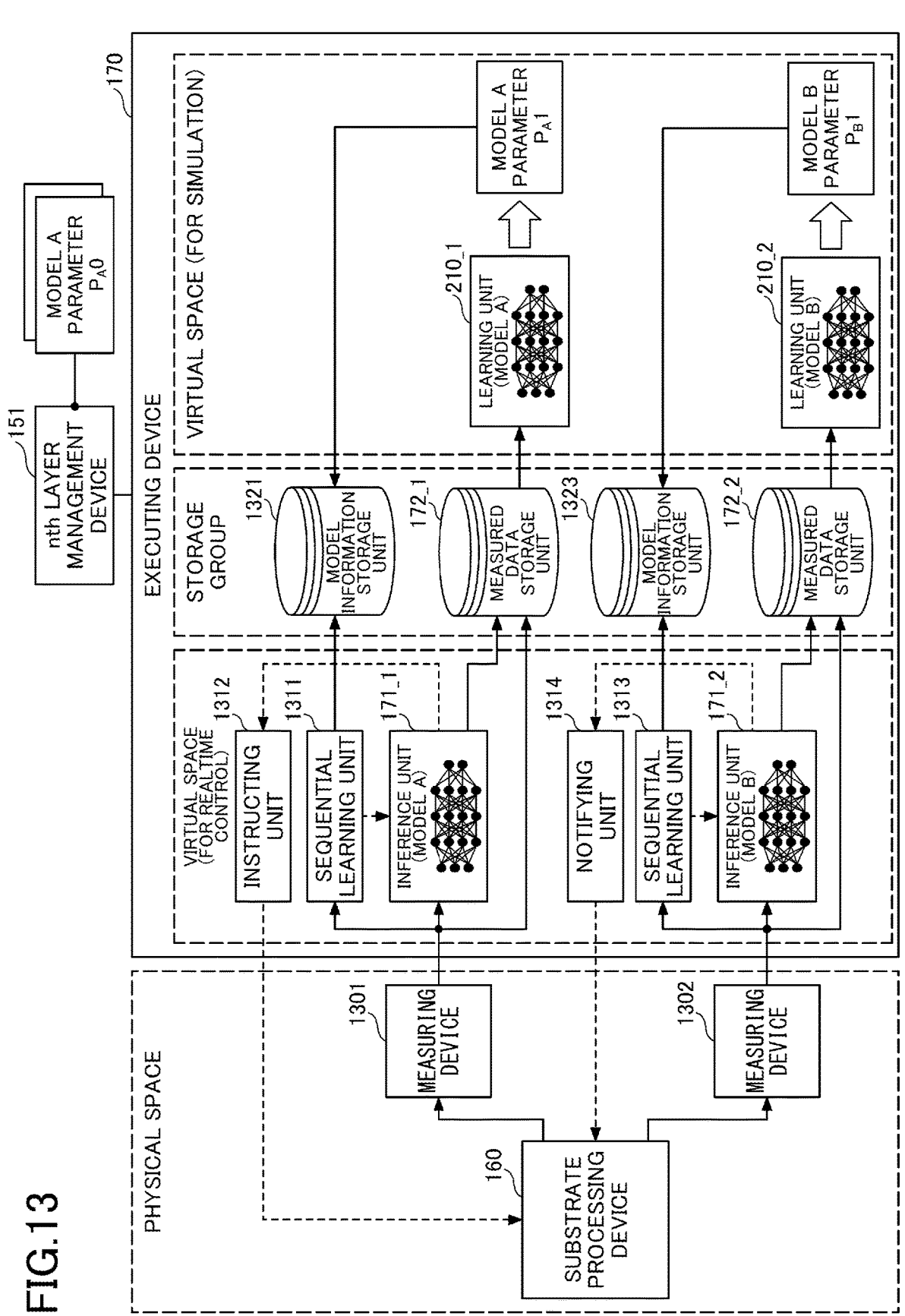
FIG. 13 is a diagram illustrating an example of a functional configuration of the executing device.

Next, a functional configuration of the executing device 170 will be described. FIG. 13 is a diagram illustrating an example of the functional configuration of the executing device. As illustrated in FIG. 13, the executing device 170 includes a virtual space (for real-time control and for simulation) in which data collected from a physical space is processed and a model is executed or updated. Additionally, the executing device 170 includes a storage group that stores the data collected from the physical space, the model parameter updated in the virtual space, and the like.

Here, the physical space from which the executing device 170 collects the data includes:

the substrate processing device 160;

a measuring device 1301 configured to measure data used for the inference unit 171_1 to execute the model or used for a sequential learning unit 1311 to perform sequential learning of the model during the substrate processing performed by the substrate processing device 160; and a measuring device 1302 configured to measure data used for the inference unit 171_2 to execute the model or used for a sequential learning unit 1313 to perform sequential learning of the model during the substrate processing performed by the substrate processing device 160.

The virtual space (for real-time control) of the executing device 170 includes the sequential learning units 1311 and 1313, an instructing unit 1312, a notifying unit 1314, and the inference units 171_1 and 171_2.

The sequential learning unit 1311 performs the sequential learning (online learning) based on the data collected by the measuring device 1301 and adjusts the model parameter of the model arranged in the inference unit 171_1. Here, the model parameter adjusted by the sequential learning unit 1311 may be stored in the model information storage unit 1321.

As described with reference to FIG. 1, the inference unit 171_1 causes the model to be executed based on the data collected from the measuring device 1301 and outputs the inference result (for example, an inference result of fault detection, an inference result of an object obtained as a result of a process treatment, an inference result of component deterioration diagnosis, an inference result of an internal state, or the like). The inference result output from the inference unit 171_1 is notified to the instructing unit 1312, and is stored in the measured data storage unit 172_1 in association with the correct data, for example.

The instructing unit 1312 generates an instruction (for example, a process target value) according to the inference result (for example, an inference result of fault detection, an inference result of an object obtained as a result of a process treatment, an inference result of component deterioration diagnosis, an inference result of an internal state, or the like) notified by the inference unit 171_1. Additionally, the instructing unit 1312 transmits the generated instruction to the substrate processing device 160. In this case, the substrate processing device 160 calculates a control value based on the transmitted instruction (for example, a process target value) and performs control. Here, the instructing unit 1312 may be achieved by a model having a learning function.

The sequential learning unit 1313 performs the sequential learning (the online learning) based on the data collected from the measuring device 1302 and adjusts the model parameter of the model arranged in the inference unit 171_2. Here, the model parameter adjusted by the sequential learning unit 1313 may be stored in the model information storage unit 1323.

As described with reference to FIG. 1, the inference unit 171_2 causes the model to be executed based on the data collected from the measuring device 1302 and outputs the inference result (for example, an inference result (a control value) in control of a process or the like). The inference result output from the inference unit 171_2 is notified to the notifying unit 1314, and is stored in the measured data storage unit 172_2 in association with the correct data, for example.

The notifying unit 1314 transmits the inference result (for example, an inference result (a control value) in control of a process or the like) notified by the inference unit 171_2 to the substrate processing device 160. In this case, the substrate processing device 160 performs control according to the transmitted inference result (for example, an inference result (a control value) in control of a process or the like).

Here, although the configuration, in which the instructing unit 1312 is arranged in the virtual space (for real-time control), is used in the example of FIG. 13, the instructing unit 1312 may be configured to be implemented in the substrate processing device 160.

The virtual space (for simulation) of the executing device 170 includes the learning units 210_1 and 210_2.

As described with reference to FIG. 2, the model (the model structure="model A", the model parameter="parameter $P_A0$") transmitted from the nth layer management device 151 is arranged in the learning unit 210_1. Additionally, when a certain amount of measured data is accumulated, the learning unit 210_1 reads the measured data from the measured data storage unit 172_1 and performs the additional learning process (the batch learning process). With this, the learning unit 210_1 stores the optimized model parameter ("parameter $P_A1$") in the model information storage unit 1321. The model parameter ("parameter $P_A1$") stored in the model information storage unit 1321 is transmitted to the nth layer management device 151 at a predetermined timing.

Here, when the new model parameter is transmitted from the nth layer management device 151, the learning unit 210_1 sets the new model parameter to the model structure="model A" and performs a simulation, using the measured data stored in the measured data storage unit 172_1. This allows the learning unit 210_1 to verify in advance whether there is a problem in the new model parameter before the new model parameter is set in the inference unit 171_1.

As described with reference to FIG. 2, the model (the model structure="model B", the model parameter="parameter $P_B0$") transmitted from the nth layer management device 151 is arranged in the learning unit 210_2. Additionally, when a certain amount of measured data is accumulated, the learning unit 210_2 reads the measured data from the measured data storage unit 172_2 and performs an additional learning process (a batch learning process). With this, the learning unit 210_2 stores the optimized model parameter ("parameter $P_B1$") in the model information storage unit 1323. The model parameter ("parameter $P_B1$") stored in the model information storage unit 1323 is transmitted to the nth layer management device 151 at a predetermined timing.

Here, when the new model parameter is transmitted from the nth layer management device 151, the learning unit 210_2 sets the new model parameter to the model structure="model B" and performs a simulation, using the measured data stored in the measured data storage unit 172_2. This allows the learning unit 210_2 to verify in advance whether there is a problem in the new model parameter before the new model parameter is set in the inference unit 171_2.

Figure 14A:
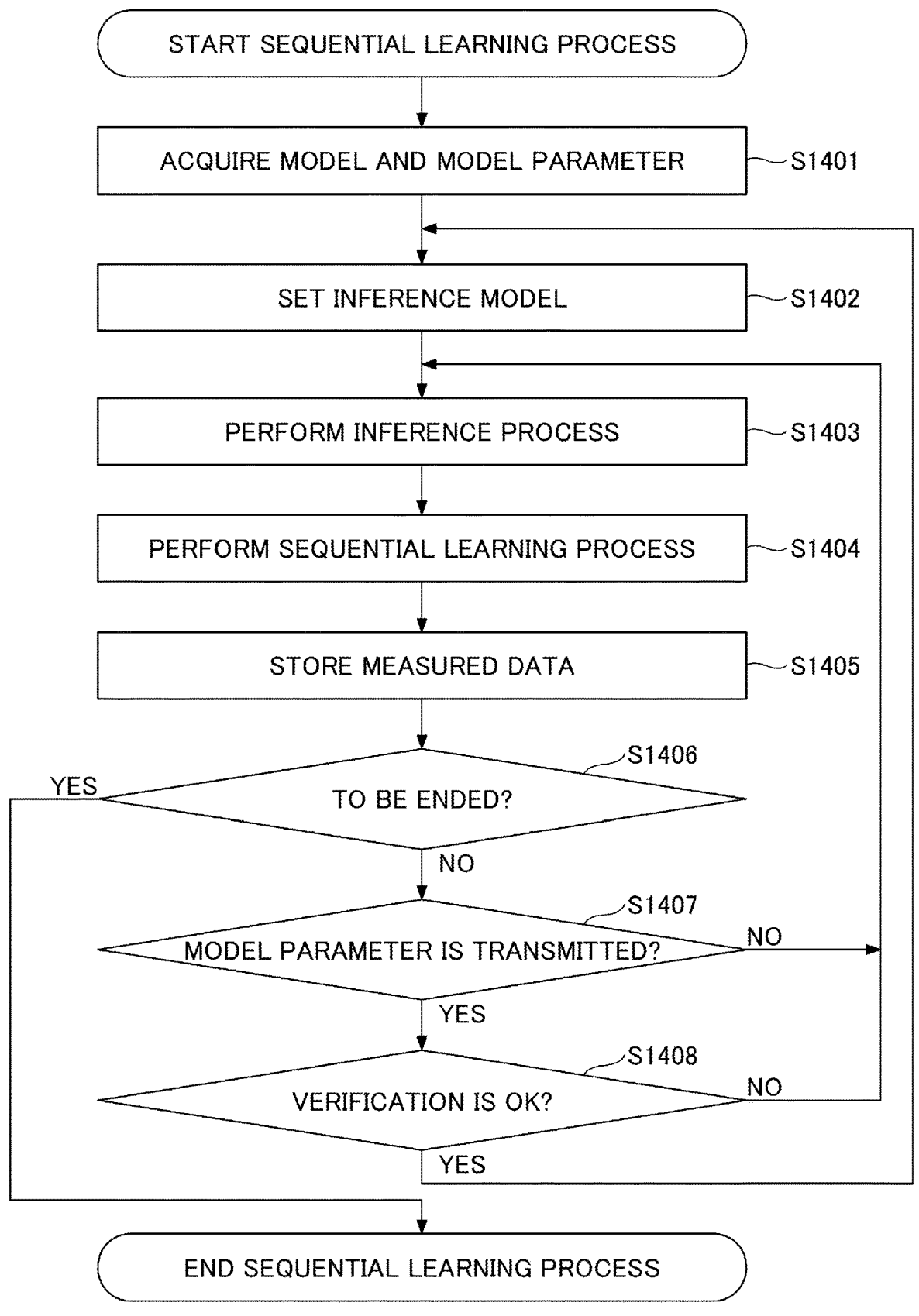
FIG. 14A is a flowchart illustrating a flow of a sequential learning process performed by the executing device.

Flow of the Sequential Learning Process and the Batch Learning Process Performed by Executing Device Next, a flow of the sequential learning process and the batch learning process performed by the executing device 170 will be described.
(1) Flow of the Sequential Learning Process
FIG. 14A is a flowchart illustrating a flow of the sequential learning process performed by the executing device.

In step S1401, the executing device 170 acquires the models (the model structures="model A", "model B", the model parameters="parameter $P_A0$", "parameter $P_B0$") from the nth layer management device 151.

In step S1401, the executing device 170 arranges, in the inference unit 171_1 and the learning unit 210_1, the model in which the model parameter="parameter $P_A0$" is set to the acquired model structure="model A". Additionally, the executing device 170 arranges, in the inference unit 171_2 and the learning unit 210_2, the model in which the model parameter="parameter $P_B0$" is set to the acquired model structure="model B".

In step S1403, the inference units 171_1 and 171_2 of the executing device 170 execute the models based on the data collected from the substrate processing device 160 to output the inference results.

In step S1404, the sequential learning units 1311 and 1313 of the executing device 170 perform the sequential learning based on the data collected from the substrate processing device 160 to adjust the model parameters.

In step S1405, the executing device 170 stores the inference results output from the inference units 171_1 and 171_2 in the measured data storage unit 172_1 or 172_2 in association with the correct data.

In step S1406, the executing device 170 determines whether to end the sequential learning process. In step S1406, if it is determined that the sequential learning process is not to be ended (NO in step S1406), the process proceeds to step S1407.

In step S1407, the executing device 170 determines whether the new model parameter has been transmitted from the nth layer management device 151. In step S1407, if it is determined that the new model parameter has not been transmitted (NO in step S1407), the process returns to step S1403.

Conversely, in step S1407, if it is determined that the new model parameter has been transmitted (YES in step S1407), the process proceeds to step S1408.

In step S1408, the executing device 170 performs a simulation, using the model parameter transmitted from the nth layer management device 151 to verify the appropriateness of the model parameter.

In step S1408, if it is not verified that the model parameter is appropriate (NO in step S1408), the process returns to step S1403.

Conversely, in step S1408, if it is verified that the model parameter is appropriate (YES in step S1408), the process returns to step S1402. Then, the model in which the new model parameter is set is arranged in the corresponding inference unit.

Figure 14B:
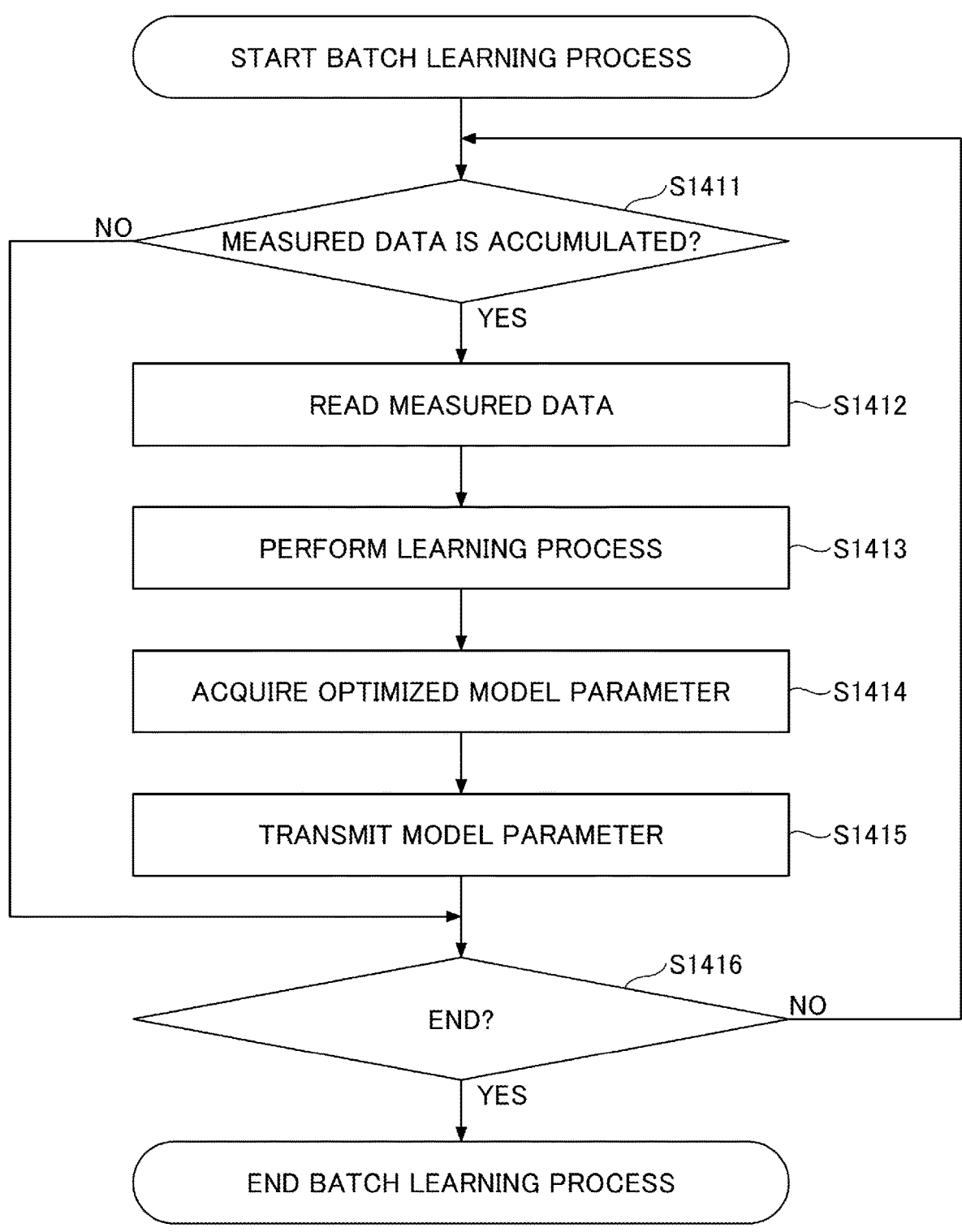
FIG. 14B is a flowchart illustrating a flow of a batch learning process performed by the executing device.

Conversely, in step S1406, if it is determined that the sequential learning process is to be ended (YES in step S1406), the sequential learning process is ended.
(2) Flow of the Batch Learning Process
FIG. 14B is a flowchart illustrating a flow of the batch learning process performed by the executing device.

In step S1411, the executing device 170 determines whether a certain amount of the measured data has been accumulated in the measured data storage units 172_1 and 172_2. In step S1411, if it is determined that a certain amount of the measured data has not been accumulated (NO in step S1411), the process proceeds to step S1416.

Conversely, in step S1411, if it is determined that a certain amount of the measured data has been accumulated (YES in step S1411), the process proceeds to step S1412.

In step S1412, the learning units 210_1 and 210_2 of the executing device 170 read the measured data from the measured data storage units 172_1 and 172_2.

In step S1413, the learning units 210_1 and 210_2 of the executing device 170 perform the additional learning process (the batch learning process), using the read measured data.

In step S1414, the executing device 170 acquires the model parameters="parameter $P_A1$" and "parameter $P_B1$" that are optimized by the learning units 210_1 and 210_2 performing the additional learning process, and stores the model parameters in the model information storage units 1321 and 1323.

In step S1415, the executing device 170 transmits the optimized model parameters to the nth layer management device 151.

In step S1416, the executing device 170 determines whether to end the batch learning process. In step S1409, if it is determined that the batch learning process is not to be ended (NO in step S1416), the process returns to step S1411.

Conversely, in step S1416, when it is determined that the batch learning process is to be ended (YES in step S1416), the batch learning process is ended.
<Summary>
As is clear from the above description, the model management system 100 according to the first embodiment is configured to:
    separately manage models applied to a substrate manufacturing process in three or more layers; and
    include a management device (a first management unit) that manages a model at an xth layer and one or more (x+1)th layer management devices (second management units) that are connected to the management device that manages the model at the xth layer and that manages one or more models at a layer one level lower. The management device that manages the model at the xth layer calculates, when one or more model parameters of the one or more models managed at the (x+1)th layer are updated, a new model parameter based on each of the updated one or more model parameters. The management device that manages the model at the xth layer performs control so that the new model parameter is set to a model managed by each of multiple management devices at the lowest layer, belonging to the management device that manages the model at the xth layer.

As described above, in the first embodiment, the models are separated in three or more layers, and the model parameters are shared between the management devices at the same layer, so that the number of models is aggregated and the management cost is reduced.

As a result, according to the first embodiment, the models applied to the substrate processing process can be efficiently managed.

Second Embodiment

In the first embodiment described above, the case where the model is separately managed in three or more layers in the same substrate processing factory has been described. However, the method of separating the models into three or more layers is not limited to this.

For example, the models may be separated into two layers in the same substrate processing factory, and a common management device that manages the models for multiple substrate processing factories may be arranged outside the factory, so that the models are managed in three or more layers as a whole.

Figure 15:
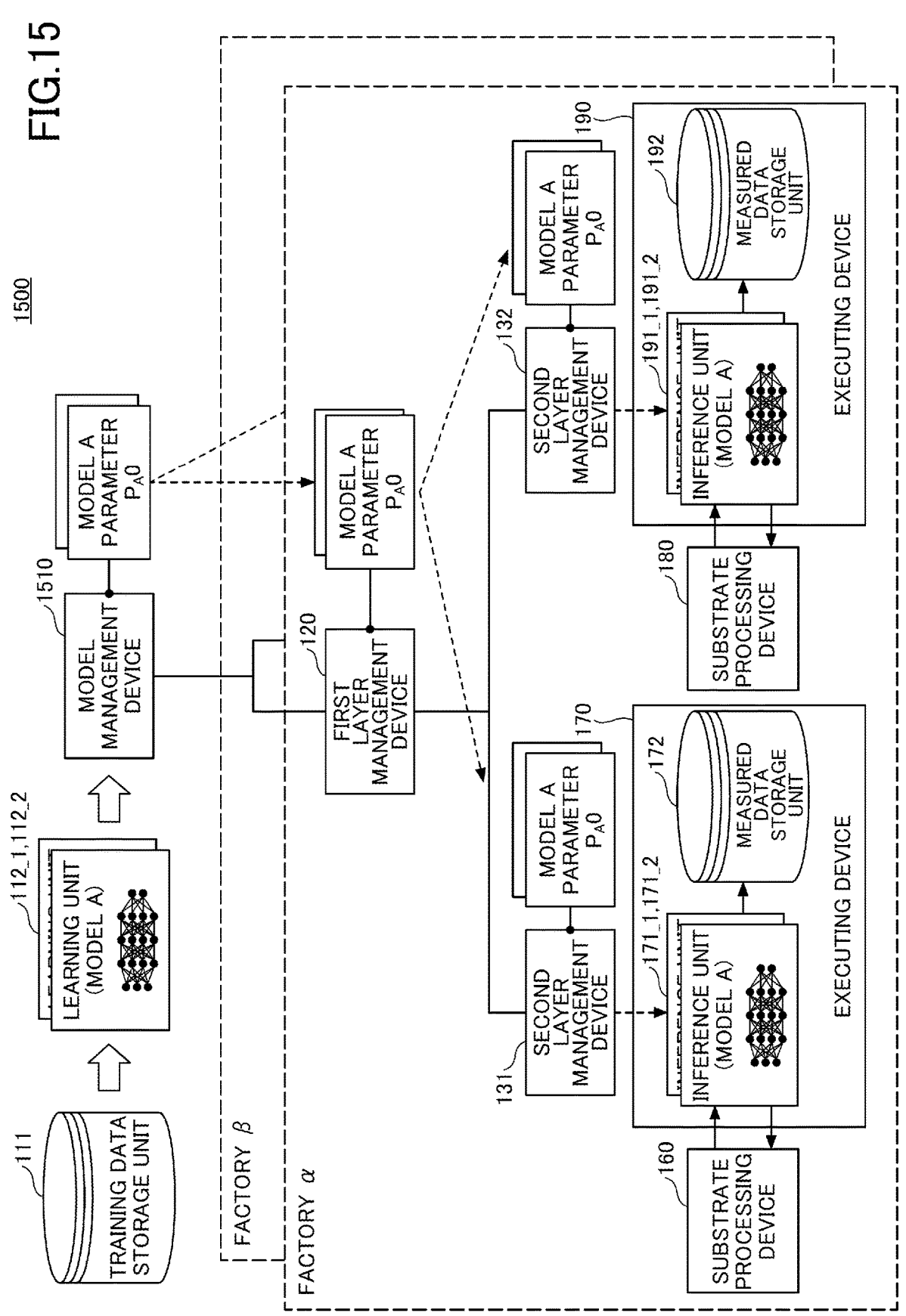
FIG. 15 is a diagram illustrating an example of a system configuration of the model management system.

FIG. 15 is a second diagram illustrating an example of a system configuration of a model management system. As illustrated in FIG. 15, in a model management system 1500, a model management device 1510 manages a model in a substrate processing factory $\alpha$ and a model in a substrate processing factory $\beta$.

Specifically, the model management device 1510 manages the models (the model structures="model A", "model B", the model parameters="parameter $P_A0$", "parameter $P_B0$"). Additionally, in the first phase, the model management device 1510 transmits the models to the first layer management device 120 of the substrate processing factory $\alpha$ and the first layer management device (which is not illustrated) of the substrate processing factory $\beta$.

Further, as illustrated in FIG. 15, in the model management system 1500, the substrate processing factory $\alpha$ includes the first layer management device 120 and the second layer management devices 131 and 132, and does not include management devices at the third layer or lower.

That is, the second layer management devices 131 and 132 are management devices at the lowest layer, and are respectively connected to the executing devices 170 and 190.

Here, for example, in the seventh phase, the model management device 1510 calculates the new model parameter based on the following:

a model parameter transmitted from the first layer management device 120 of the substrate processing factory $\alpha$ in a sixth phase; and a model parameter transmitted from the first layer management device 120 of the substrate processing factory $\beta$ in the sixth phase.

Additionally, in the seventh phase, the model management device 1510 manages the new model parameter and transmits the new model parameter to the first layer management device 120 of the substrate processing factory $\alpha$ and the first layer management device of the substrate processing factory $\beta$.

With this, the model parameters of the models managed by the multiple management devices (the multiple management devices of the substrate processing factories $\alpha$ and $\beta$) at the lowest layer, belonging to the model management device 1510 are updated using the new model parameter.

As described above, in the second embodiment, the models are separated into two layers in the same substrate processing factory, and a common management device that manages the models of the multiple substrate processing factories is arranged outside the factory, so that the models are separately managed in three or more layers as a whole. Thus, according to the second embodiment, the same effects as those of the first embodiment can be obtained.

Other Embodiments

In the first and second embodiments described above, the first layer management device to the nth layer management device are separate management devices, but the first layer management device to the nth layer management device may be formed as an integrated device.

Additionally, in the first and second embodiments described above, when the xth layer management device transmits a newly generated model parameter, the model parameter is transmitted to all management devices that are at a layer one level lower than the xth layer management device and that are connected to the xth layer management device in the above description. However, the transmission destination of the model parameter may be configured such that the model parameter is transmitted to part of the management devices that are at a layer one level lower than the xth layer management device and that are connected to the xth layer management device.

Additionally, in the first and second embodiments described above, the management process in the case where the model management system manages the models corresponding to the respective purposes of each of the existing substrate processing devices has been described. However, the same applies to a case where a new substrate processing device is added. Specifically, a management device that manages models corresponding to respective purposes of the new substrate processing device is configured to:

be connected to a management device that manages a model corresponding to a group of new substrate processing devices;

acquire a model structure and a model parameter (a latest model parameter at the time of addition) from a management device at a layer one level higher, to which the management device is connected;

manage and transmit the acquired model and model parameter to a corresponding executing device.

With this, when the new substrate processing device is added, the latest model can be arranged in the inference unit of the corresponding executing device as a model corresponding to each purpose of the newly added substrate processing device. That is, the management device that manages the models corresponding to the respective purposes of the new substrate processing device performs control so that the latest model parameter is set to the model corresponding to each purpose of the new substrate processing device.

Here, when the latest model parameter is transmitted to the management device that manages the model corresponding to each purpose of the new substrate processing device, the latest model parameter is also transmitted to another management device at the same layer. However, the management device may be configured such that the latest model parameter is not transmitted to another management device in the same layer, and the set model parameter is continuously managed. Additionally, when the latest model parameter is transmitted, the management device may be configured such that a simulation is performed in advance, and the latest model parameter may be transmitted after the verification is completed.

Additionally, although the details of the model are not mentioned in the first and second embodiments described above, the model used in the first and second embodiments described above may be, for example, a machine learning model including deep learning, and may be, for example:

recurrent neural network (RNN);
long short-term memory (LSTM);
convolutional neural network (CNN);
region based convolutional neural network (R-CNN);
you only look once (YOLO);
single shot multibox detector (SSD)
generative adversarial network (GAN)
support vector machine (SVM)
decision tree; or
random forest.

Here, alternatively, a model using a genetic algorithm such as a genetic algorithm (GA) or genetic programming (GP) or a model trained by reinforcement learning may be used.

Alternatively, the model used in the first and second embodiments described above may be a model obtained by general statistical analysis other than deep learning, such as principal component regression (PCR), partial least square (PLS), LASSO, ridge regression, linear polynomial, an autoregressive model, a moving average model, an autoregressive moving average model, and an ARX model.

Additionally, in the first and second embodiments described above, the model management program is executed independently by each of the management devices of the respective layers in the above description. However, in a case where the management device at each layer is configured by, for example, multiple computers and the model management program is installed in the multiple computers, the model management program may be executed in a form of distributed computing.

Additionally, in the first and second embodiments described above, the management device is configured by a separate device for each layer in the above description, but as long as the management is separated for each layer, the management devices at different layers may be configured as an integrated device. Alternatively, the management devices may be configured such that part of the functions can be shared and executed among the management devices at different layers.

Additionally, in the first and second embodiments described above, as an example of a method of installing the model management program in the auxiliary storage device 905, a method of downloading and installing the model management program via a network, which is not illustrated, has been described. At this time, although a download source is not particularly mentioned, when the model management program is installed by such a method, the download source may be, for example, a server device in which the model management program is accessibly stored. Additionally, the server device may be, for example, a device that receives access from the management device via a network, which is not illustrated, and downloads the model management program on condition of payment. That is, the server device may be a device that provides a service for providing the model management program.

Here, the present invention is not limited to the configurations described herein, such as the configurations described in the above embodiments, combinations with other elements, and the like. These points can be changed within a range not departing from the spirit of the present invention, and can be appropriately determined according to the application form.

This application is based upon and claims the priority to Japanese Patent Application No. 2020-187177 filed on Nov. 10, 2020, the entire contents of which are incorporated herein by reference.

DESCRIPTION OF REFERENCE SYMBOLS

100: model management system
110: model management device
120: first layer management device
131 to 133: second layer management device
141: (n−1)th layer management device
151, 152: nth layer management device
160, 180: substrate processing device
170, 190: executing device
171_1, 171_2: inference unit
191_1, 191_2: inference unit
210_1, 210_2: learning unit
220_1, 220_2: learning unit
1001: higher layer information acquiring unit
1002: sharing unit
1003: lower layer information acquiring unit
1004: optimizing unit
1005: higher layer information transmitting unit

What is claimed is:

1. A model management system comprising:

a first management device configured to manage a model at a predetermined layer among layers, the layers being three or more layers;

one or more second management devices configured to manage one or more models at a layer one level lower than the predetermined layer; and one or more executing devices, wherein the first management device includes:

a processor; and a memory storing program instructions that cause the processor to:

when one or more model parameters of the one or more models managed by the one or more second management devices are updated, calculate a new model parameter based on each of the updated one or more model parameters, and perform control so that the new model parameter is set in a plurality of models respectively managed by a plurality of management devices at a lowest layer, the plurality of management devices belonging to the first management device, transmit the new model parameter to a management device that manages a model at a layer one level higher than the model managed by the first management device, and wherein the model management system is configured to separately manage models applied to a substrate manufacturing process in the layers, wherein the one or more executing devices collect data measured while a substrate is processed by a substrate processing device and execute a model among the plurality of models based on the collected data to output an inference result, and wherein the one or more executing devices transmit, to the substrate processing device, an instruction based on the output inference result, the instruction causing the substrate processing device to perform the substrate manufacturing process on the substrate.

2. The model management system as claimed in claim 1, wherein the layers are separated according to a device model of the substrate processing device that performs the substrate manufacturing process, a chamber type of the substrate processing device that performs the substrate manufacturing process, or a process group of the substrate processing device that performs the substrate manufacturing process.

3. The model management system as claimed in claim 1, wherein the models include a model that outputs an inference result of fault detection of the substrate processing device that performs the substrate manufacturing process.

4. The model management system as claimed in claim 1, wherein the processor calculates the new model parameter when a predetermined condition is satisfied, and the processor performs the control so that the new model parameter is set in the plurality of models at the lowest layer at predetermined timings.

5. The model management system as claimed in claim 1, wherein the processor performs the control so that, when a new device that performs the substrate manufacturing process is added, the new model parameter is set in a model corresponding to the added device.

6. The model management system as claimed in claim 1, wherein the one or more model parameters of the one or more models managed by the one or more second management devices are updated based on data collected in the substrate processing device.

7. The model management system as claimed in claim 1, wherein the inference result includes an inference result of fault detection.

8. The model management system as claimed in claim 7, wherein the inference result of the object obtained as the result of the process treatment includes an inference of a film formation rate, an inference of an etching rate, an inference of a shape of the object.

9. A model management method of a model management system, comprising:

managing, by a first management device, a model at a predetermined layer among layers, the layers being three or more layers;

managing, by one or more second management devices, one or more models at a layer one level lower than the predetermined layer, wherein the managing of the model at the predetermined layer includes:

when one or more model parameters of the one or more models are updated, calculating a new model parameter based on each of the updated one or more model parameters, and performing control so that the new model parameter is set in a plurality of models respectively managed by a plurality of management devices at a lowest layer, the plurality of management devices belonging to the first management device, transmitting the new model parameter to a management device that manages a model at a layer one level higher than the model managed by the first management device, and wherein the model management system is configured to separately manage models applied to a substrate manufacturing process in the layers, wherein the model management method further comprises:

collecting, by one or more executing devices, data measured while a substrate is processed by a substrate processing device and executing, by the one or more executing devices, a model among the plurality of models based on the collected data to output an inference result; and transmitting, by the one or more executing devices, to the substrate processing device, an instruction based on the output inference result, the instruction causing the substrate processing device to perform the substrate manufacturing process on the substrate.

10. A non-transitory computer-readable recording medium having stored therein a model management program causing a computer of a model management system to perform a process comprising:

managing, by a first management device, a model at a predetermined layer among layers, the layers being three or more layers;

managing, by one or more second management devices, one or more models at a layer one level lower than the predetermined layer, wherein the managing of the model at the predetermined layer includes:

when one or more model parameters of the one or more models are updated, calculating a new model parameter based on each of the updated one or more model parameters, and performing control so that the new model parameter is set in a plurality of models respectively managed by a plurality of management devices at a lowest layer, the plurality of management devices belonging to the first management device, transmitting the new model parameter to a management device that manages a model at a layer one level higher than the model managed by the first management device, and wherein the model management system is configured to separately manage models applied to a substrate manufacturing process in the layers, wherein the process further comprises:

collecting, by one or more executing devices, data measured while a substrate is processed by a substrate processing device and executing, by the one or more executing devices, a model among the plurality of models based on the collected data to output an inference result; and transmitting, by the one or more executing devices, to the substrate processing device, an instruction based on the output inference result, the instruction causing the substrate processing device to perform the substrate manufacturing process on the substrate.

* * * * *